(12) United States Patent
Rivard

(10) Patent No.: US 8,971,637 B1
(45) Date of Patent: Mar. 3, 2015

(54) METHOD AND SYSTEM FOR IDENTIFYING AN EDGE IN AN IMAGE

(75) Inventor: Dominique Rivard, Pierrefonds (CA)

(73) Assignee: Matrox Electronic Systems Ltd., Dorval, QC, CA (US)

( * ) Notice: Subject to any disclaimer, the term of this patent is extended or adjusted under 35 U.S.C. 154(b) by 174 days.

(21) Appl. No.: 13/550,288

(22) Filed: Jul. 16, 2012

(51) Int. Cl.
*G06K 9/48* (2006.01)

(52) U.S. Cl.
USPC .......................................... 382/199; 382/266

(58) Field of Classification Search
CPC ..................................................... G06T 7/0083
USPC ................................................. 382/199, 266
See application file for complete search history.

(56) References Cited

U.S. PATENT DOCUMENTS

| | | | |
|---|---|---|---|
| 5,081,689 A | 1/1992 | Meyer et al. | |
| 5,444,798 A | 8/1995 | Enomoto et al. | |
| 5,548,415 A | 8/1996 | Tanaka et al. | |
| 5,625,717 A | 4/1997 | Hashimoto et al. | |
| 6,094,508 A | 7/2000 | Acharya et al. | |
| 6,167,150 A * | 12/2000 | Michael et al. | 382/149 |
| 6,714,676 B2 | 3/2004 | Yamagata et al. | |
| 6,738,496 B1 | 5/2004 | Van Hall | |
| 6,900,801 B2 * | 5/2005 | Lee | 345/419 |
| 6,901,171 B1 * | 5/2005 | Dutta-Choudhury et al. | 382/266 |
| 6,954,550 B2 * | 10/2005 | Fujieda | 382/199 |
| 6,999,209 B2 | 2/2006 | Kelly et al. | |
| 7,043,080 B1 * | 5/2006 | Dolan | 382/199 |
| 7,460,272 B2 | 12/2008 | Hara | |
| 7,508,541 B2 | 3/2009 | Ishiguro | |
| 7,899,248 B2 | 3/2011 | Liu | |
| 8,004,732 B2 | 8/2011 | Sakaue | |
| 8,005,318 B2 | 8/2011 | Ou et al. | |
| 8,019,119 B2 | 9/2011 | Rising | |
| 8,064,714 B2 | 11/2011 | Albiez | |
| 2004/0109592 A1 * | 6/2004 | Bankman et al. | 382/128 |
| 2006/0029284 A1 * | 2/2006 | Stewart | 382/255 |
| 2011/0123121 A1 | 5/2011 | Springer et al. | |
| 2011/0235921 A1 | 9/2011 | Springer et al. | |
| 2011/0286672 A1 | 11/2011 | Yamanaka | |

OTHER PUBLICATIONS

Navon et al., "Color image segmentation based on adaptive local thresholds"; Image and Vision Computing, vol. 23, Issue 1; Jan. 1, 2005; pp. 69-85.

Moon H. et al., "Optimal edge-based shape detection"; IEEE Transactions on Image Processing, vol. 11, Issue 11; Nov. 2002; pp. 1209-1226.

(Continued)

*Primary Examiner* — Samir Ahmed

(74) *Attorney, Agent, or Firm* — Anglehart et al.

(57) ABSTRACT

A method and system for identifying an edge in a portion of an image, the portion having an associated intensity variation. An edge candidate is detected at a local extremum of the intensity variation (i.e. at a position along the x-axis that corresponds to a peak or valley of the intensity variation). A local threshold associated with the edge candidate is computed on the basis of a slope tolerance and the slope value of the edge candidate, where this local threshold defines a boundary region for the edge candidate. If the edge candidate is determined to be a global extremum (i.e. the highest peak or lowest valley) within its respective boundary region, the edge candidate is verified as being an actual edge of the image portion. Identification of this verified edge may include determination of one or more of a plurality of characteristics of the edge.

29 Claims, 30 Drawing Sheets

(56) References Cited

OTHER PUBLICATIONS

Canny, John; "A computational approach to edge detection"; IEEE Transactions on Pattern Analysis and Machine Intelligence, vol. PAMI-8, Issue 6; Nov. 1986; pp. 679-698 http://www.limsi.fr/Individu/vezien/PAPIERS_ACS/canny1986.pdf.

Ehrich, Roger W., "One-dimensional edge detection and representation"; Technical Report CS 79007-R, Department of Computer Science, Virginia Polytechnic Institute and State University; Sep. 1979; pp. 1-27.

* cited by examiner

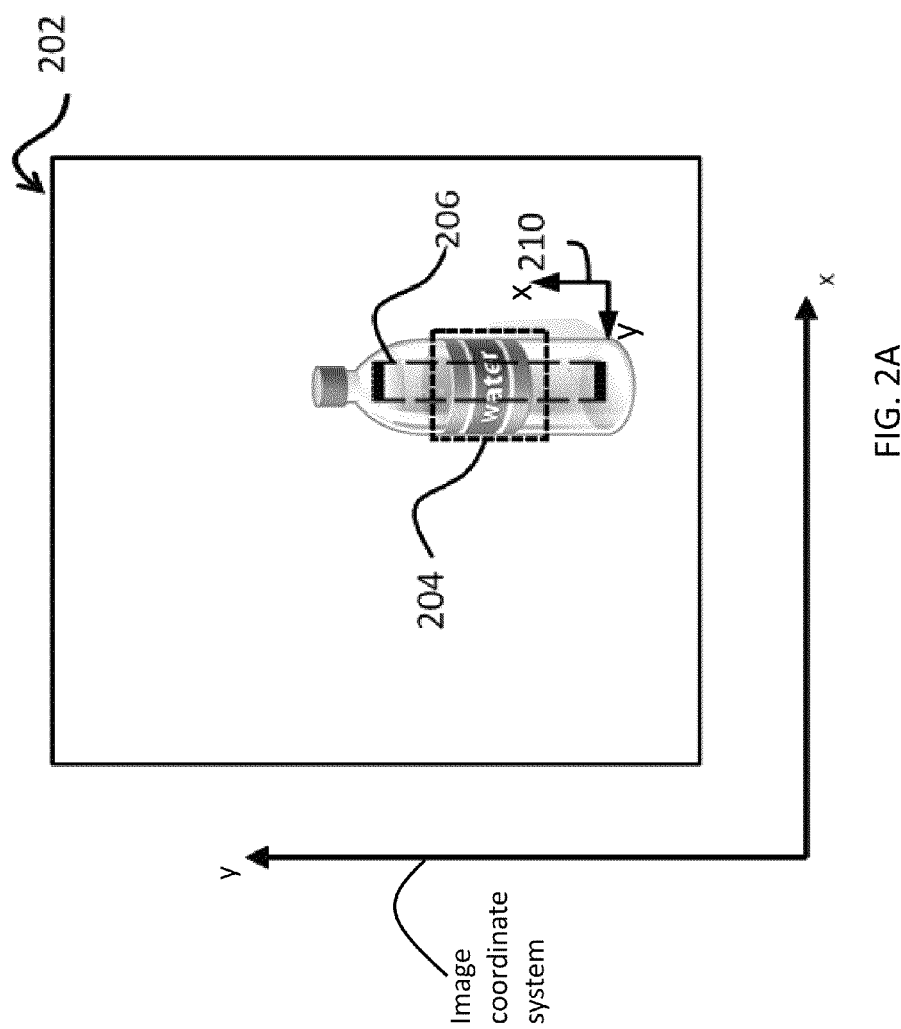

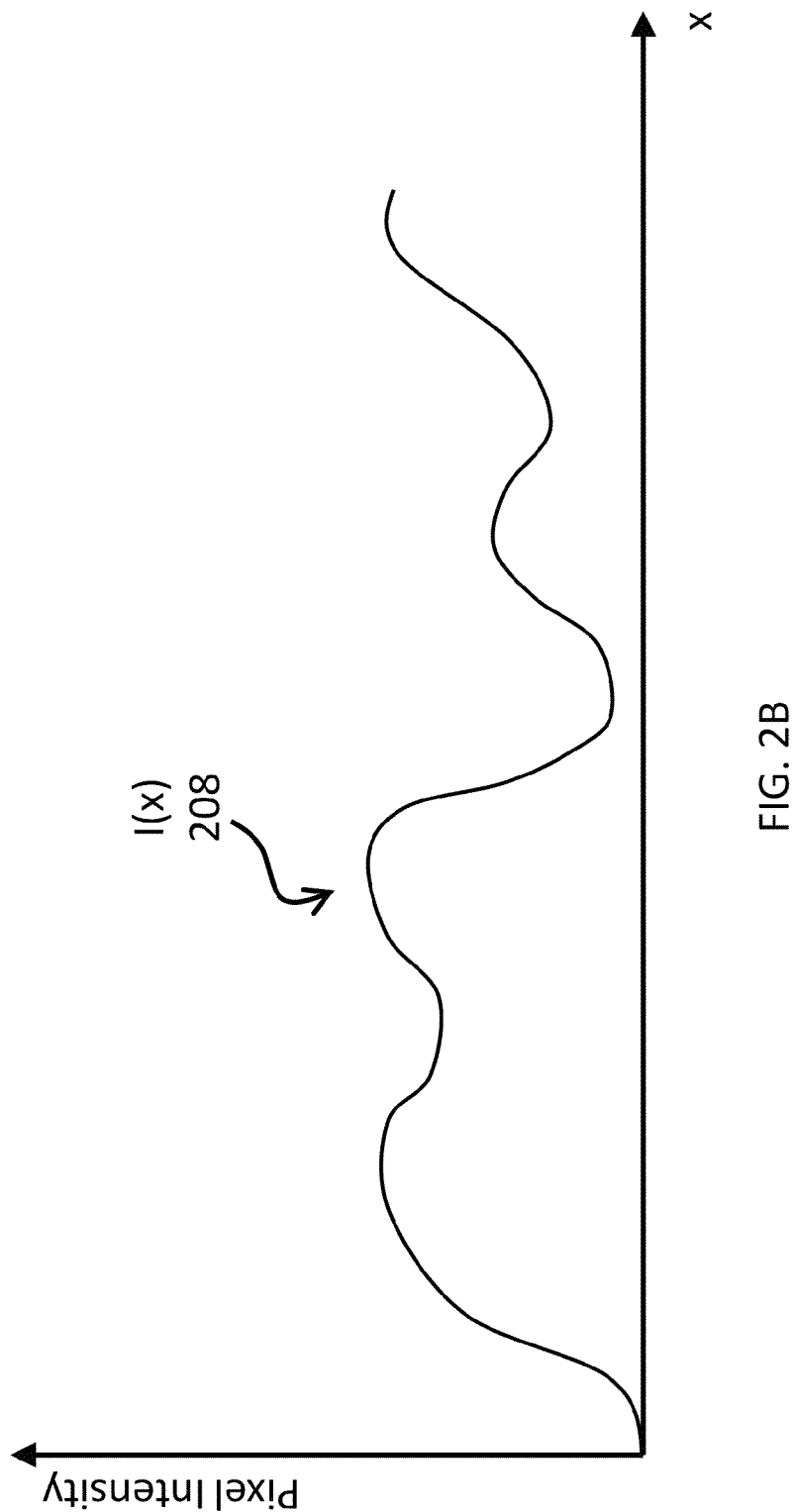

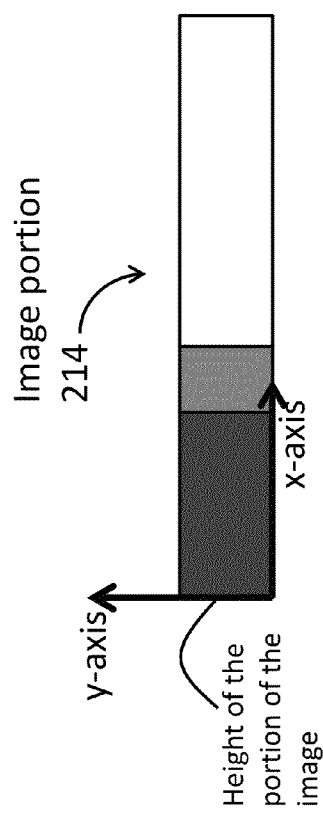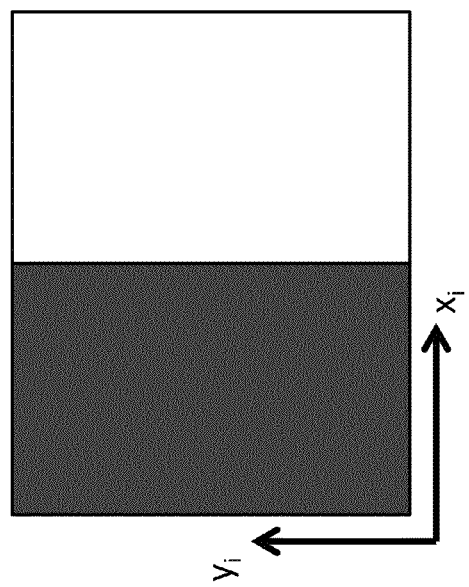

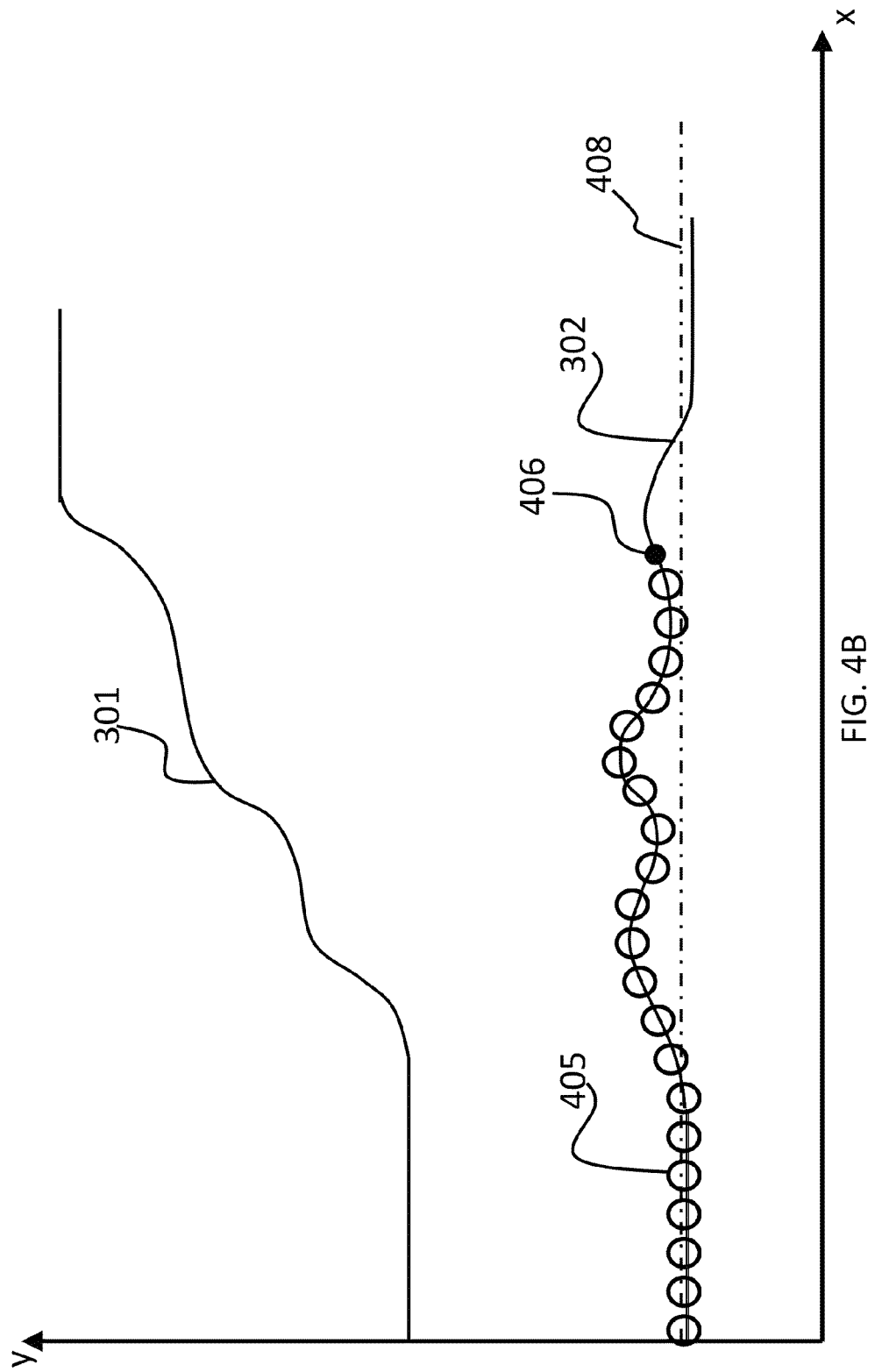

METHOD AND SYSTEM FOR IDENTIFYING AN EDGE IN AN IMAGE

TECHNICAL FIELD

The present invention relates generally to the field of edge detection in image processing. More particularly, the present invention relates to a method and system for identifying an edge of an object in an image by detecting sudden changes in image intensity.

BACKGROUND

The detection of sudden changes in image intensity for identifying an edge in an image is known as edge detection, a commonly used technique in image processing and computer vision. Edges define an outline of an object (i.e. a boundary between an object and its background or between an object and another object). When the edges of an object in an image are accurately identified, a location of the object within the image can be determined and further analysis of the object's properties may be accomplished.

For instance, in manufacturing plants or factories, industrial machine vision systems may perform edge detection as a means of assessing manufacturing quality. For example, the vision system may be adapted to measure and verify dimensions of an object based on the location of identified edges. In another example, the vision system may be adapted to use edge detection to localise labels on bottles speeding by on a production line, such that the label and the information provided thereon may be further analysed.

In the field of artificial intelligence, where computers such as robots are adapted to simulate human behavior, edge detection may also be used to analyse and comprehend the surrounding environment.

There are numerous known algorithms that are applied in image processing systems for enhancing or detecting edges. Each such algorithm has its respective advantages and disadvantages. One common disadvantage is the inability to accurately detect the actual edges in the image due to noise and lighting effects in the image.

A particular image processing algorithm for identifying an edge in an image portion uses the slope (i.e. first derivative) of a one-dimensional intensity profile of the image portion, as shown in FIG. 1. Since this slope represents the intensity variation in the image portion, an extremum of the slope 100 (i.e. a peak/maximum or a valley/minimum) may indicate the presence of an edge in the corresponding image portion, depending on a degree of sensitivity of the algorithm. The algorithm relies on a global threshold, which represents the minimum variation in the intensity profile (i.e. the minimum positive slope value or the maximum negative slope value) to be considered for identifying an edge and thus sets the degree of sensitivity with which edges are identified. In other words, each extremum of the slope 100 may be indicative of the presence of a potential edge (or edge candidate), the algorithm determining whether or not each potential edge is an actual edge at least in part on a basis of the global threshold. This global threshold may be established on the basis of various factors, for example according to an image quality, preliminary trials or a best-fit-all value that is built into the algorithm. Furthermore, the global threshold may be set by a user or automatically according to an analysis of the image and its properties. In one example, the global threshold is set according to the best-fit-all value, such as for example 2% of a maximum possible total intensity value.

As shown in FIG. 1, global threshold 102A is defined for the positive portion of the slope 100, while global threshold 102B is defined for the negative portion of the slope 100. A point on the positive portion of slope 100 is an edge candidate if its intensity variation is greater than the global threshold 102A, while a point on the negative portion of slope 100 is an edge candidate if its intensity variation is smaller than the global threshold 102B. In a specific example of use, for each section of the slope 100 that extends between two consecutive crossings of the global threshold by the slope 100, the edge detection algorithm may define that only the highest/lowest peak/valley above/below the respective global threshold is considered to represent a positive/negative edge for the profiled image portion. Thus, in the example of FIG. 1, peak 104A would be identified as representing a positive edge, while peak 106A would be ignored and considered to be noise. However, valleys 104B and 106B would both be identified as representing a respective negative edge. For each slope peak or valley identified as being representative of an edge in the image portion, the actual edge location in the image portion may be determined on a basis of the corresponding position of the peak or valley along the x-axis of the coordinate system of the image portion.

In this known edge detection algorithm, a single, constant threshold is used to analyse all points of the intensity variation 100 for identifying edges in the image portion (i.e. for the entire image portion being analysed). Unfortunately, this provides a limited amount of sensitivity for filtering out noise and lighting effects from actual edges in the image, such that certain edges in the image may be overlooked and considered as noise, while noise and or lighting effects in the image may be falsely identified as edges.

More specifically, such an edge detection algorithm will often fail to detect all edges of an image portion when the intensity profile of the image portion is ambiguous, for example due to noise or ambiguous edges in the image portion. In one possible scenario, when an image portion includes multiple potential edges of the same polarity within proximity of one another, this may create an ambiguous edge region in the intensity profile and it may be impossible to identify all of the actual edges from the slope of the intensity profile using a single, constant global threshold. Taking for example the particular intensity profile illustrated in FIG. 19, the intensity profile 1900 varies gradually from a low intensity value to a higher intensity value and includes three consecutive potential edges, which correspond to three extrema on the slope 1902 of this intensity profile 1900. In such a scenario, of the three potential edges, the use of a single, constant global threshold 1903 to analyse the slope 1902 of the intensity profile 1900 will only allow to locate one or two of these edges. Even if the global threshold 1903 were varied (i.e. set to different, constant values in an attempt to obtain different edge detection results) to 1903A or 1903B for example, the maximum possible number of edges identified by this technique for a particular one of these global thresholds would be two. Thus, the standard global threshold-based algorithm is incapable of locating all of the edges within such an image portion, and this exemplary scenario illustrates an unfortunate limitation of the global threshold-based algorithm which is often problematic in edge detection applications.

There thus exists a need in the industry to provide an edge detection method and system that is adapted to robustly and adaptively identify all of the actual edges in an image portion, irrespective of ambiguity in the corresponding intensity profile or changes therein that may be caused by noise or other types of undesirable light effects.

SUMMARY

In accordance with a broad aspect, the present invention provides a method for identifying with a computing unit an edge in a portion of an image, where the image portion has an associated intensity variation. The method includes identifying a position of an edge candidate and determining a slope value from the intensity variation at the position; calculating a local threshold associated with the edge candidate on a basis of a slope tolerance and the slope value at the position; determining if the edge candidate corresponds to an actual edge of the image portion by analysing the intensity variation within a boundary region extending on either side of the edge candidate's position, the boundary region defined by the local threshold; and, if the edge candidate corresponds to an actual edge, identifying the edge as located in the portion of the image.

In accordance with another broad aspect, the present invention provides a computer readable medium encoded with instructions that when executed by at least one processor implements a method for identifying an edge in a portion of an image. The portion of the image has an associated intensity variation. The method includes identifying a position of an edge candidate and determining from the intensity variation a slope value at the position; calculating a local threshold associated with the edge candidate on a basis of a slope tolerance and the slope value at the position; determining if the edge candidate corresponds to an actual edge of the image portion by analysing the intensity variation within a boundary region extending on either side of the edge candidate's position, the boundary region defined by the local threshold; and, if the edge candidate corresponds to an actual edge, identifying the edge as located in the portion of the image.

In accordance with yet another broad aspect, the present invention provides an image processor adapted to detect an edge in a portion of an image, the image portion being associated with an intensity variation. The image processor includes an edge determining module operative to calculate a local threshold for an edge candidate, based on a slope value at the edge candidate's position and a slope tolerance. The module is operative to determine if the edge candidate corresponds to an actual edge of the image portion by analysing the intensity variation within a boundary region extending on either side of the edge candidate's position, where the boundary region is defined by the local threshold.

BRIEF DESCRIPTION OF THE DRAWINGS

The invention will be better understood by way of the following detailed description of embodiments of the invention with reference to the appended drawings, in which:

FIG. 2A illustrates an image of a bottle for which a label position and dimension are to be identified using edge detection;

FIG. 2B illustrates an example of a one-dimensional intensity profile taken along an x-axis of a coordinate system associated with an image portion;

FIG. 2D illustrates a non-limiting example of a selected image portion that comprises the entire image;

FIG. 2E illustrates another non-limiting example of a selected image portion that comprises the entire image;

FIG. 4B illustrates the intensity variation of FIG. 4A, showing the analysis of the slope values for sequential positions along the x-axis, according to a non-limiting example of implementation of the present invention;

DETAILED DESCRIPTION

Figure 1:
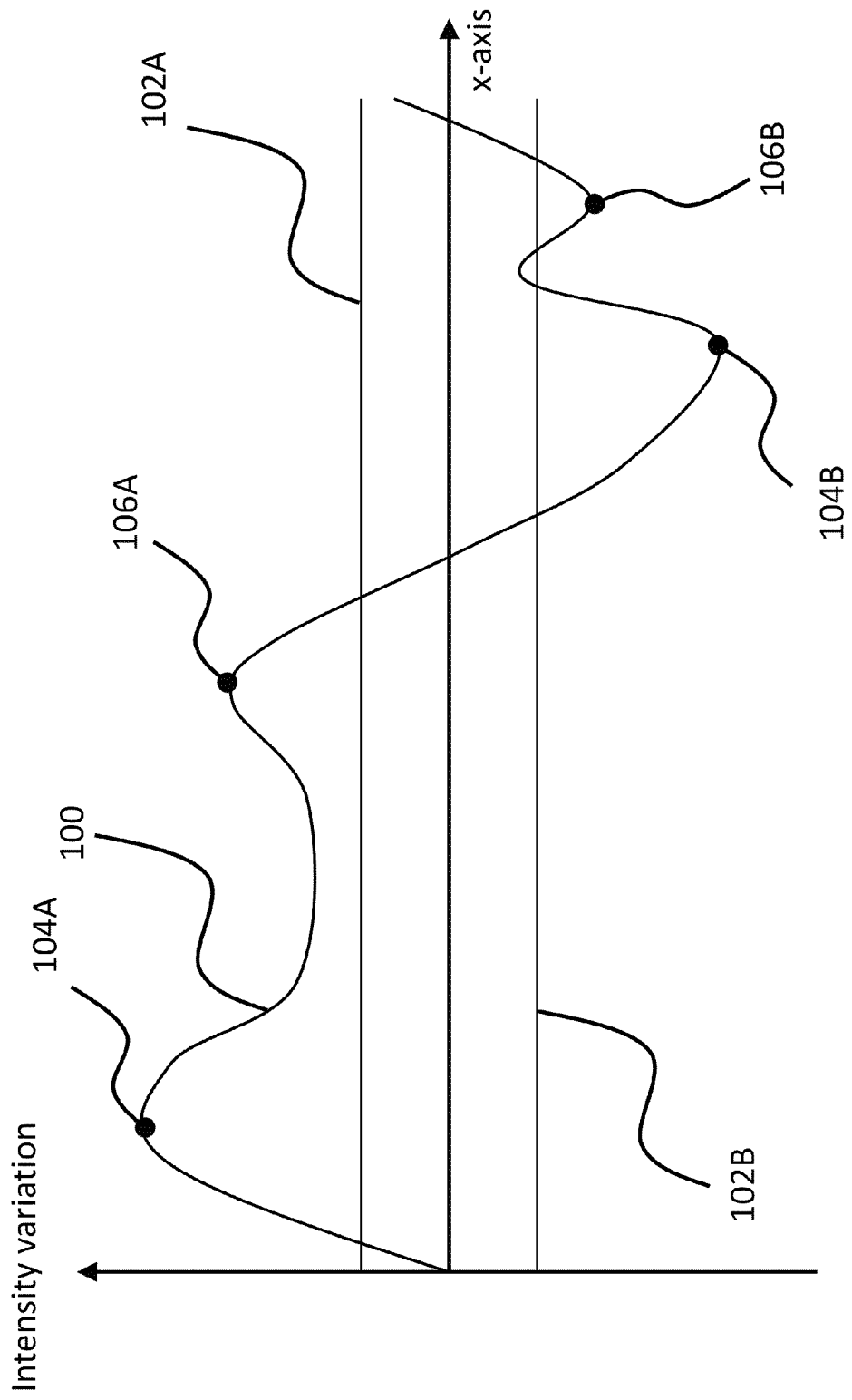
FIG. 1 illustrates a one-dimensional intensity profile representation of an image portion, to which is applied an edge detection algorithm based on a global threshold, according to the prior art.

The present invention is directed to a novel method for detecting or identifying an edge in an image that has been digitally acquired by any suitable device, such as a camera, a video camera, a scanner or a computer, among other possibilities.

The image that is acquired and that is to be analyzed for the presence of edges may be an image from a physical scene, a printed material or a sequence of images (e.g. video images). Once such an image has been acquired, a computing unit such as a processor, an image processor, a dedicated hardware component or any other suitable computing unit may be adapted to receive the image and to process the image to identify the presence of an edge in the image.

FIG. 2A illustrates an example of an image 202 of a bottle that was taken by a camera, showing a label attached to the surface of the bottle. In a bottle production line, such an image 202 may be analysed for sorting purposes, including for example correctly identifying the label position on the bottle (as represented by the dashed rectangular area 204). In a non-limiting example of use of edge detection, an edge of the label must be detected in order to identify the label position 204 on the bottle and its dimensions. Thus, a computing unit may receive the image 202 and process the image 202 to identify the edges therein. When the label position is correctly identified, further analysis of the label content may be pursued. Other types of analysis may also be performed on the bottle and/or its label, such as for example determining if the appropriate label has been apposed on the bottle; determining if the orientation of the label on the bottle is correct, determining the dimensions of the label (width, height, etc.), verifying that the cap of the bottle is properly sealed, etc.

Note that although the example of using edge detection to verify and analyse labels on bottles in a bottle production line is presented herein for illustrative purposes, edge detection in an image may be required and implemented in a variety of different applications, all included within the scope of the present invention.

When analysing an image for detecting edges therein, a region or portion of the image may be selected to be processed and analysed for the presence of an edge, depending on the specific application, as well as on the size, type and amount of information presented in the acquired image. For example, in the case of the image 202 shown in FIG. 2A, the computing unit may be adapted to select image portion 206 and to process this image portion 206 for identifying the presence of one or a plurality of edges therein.

Note that, in the context of the present specification, a "portion" or "region" of an image may refer to a group of pixels, a line of pixels, a group of pixel lines, a partial area of the image or the entire image. Moreover, an image or a portion of the image may comprise a single object (such as in the non-limiting example of FIG. 2A), a variety of different objects or a portion of one or more different objects, without departing from the scope of the present invention.

An image portion that is selected to be analysed for the presence of an edge may be rectangular in shape (such as image portion 206 in FIG. 2A) and may have various orientations within the image, where the use of such rectangular image regions or portions to analyse an image allows for a certain amount of absorption/reduction of noise that may be present in the digital image. However, different shapes and sizes of such an image portion are possible and included in the scope of the present invention. Furthermore, the orientation of an image portion to be analysed may be selected on a basis of an orientation of an edge to be detected within the image portion, as will be discussed in further detail below.

Figure 2C:
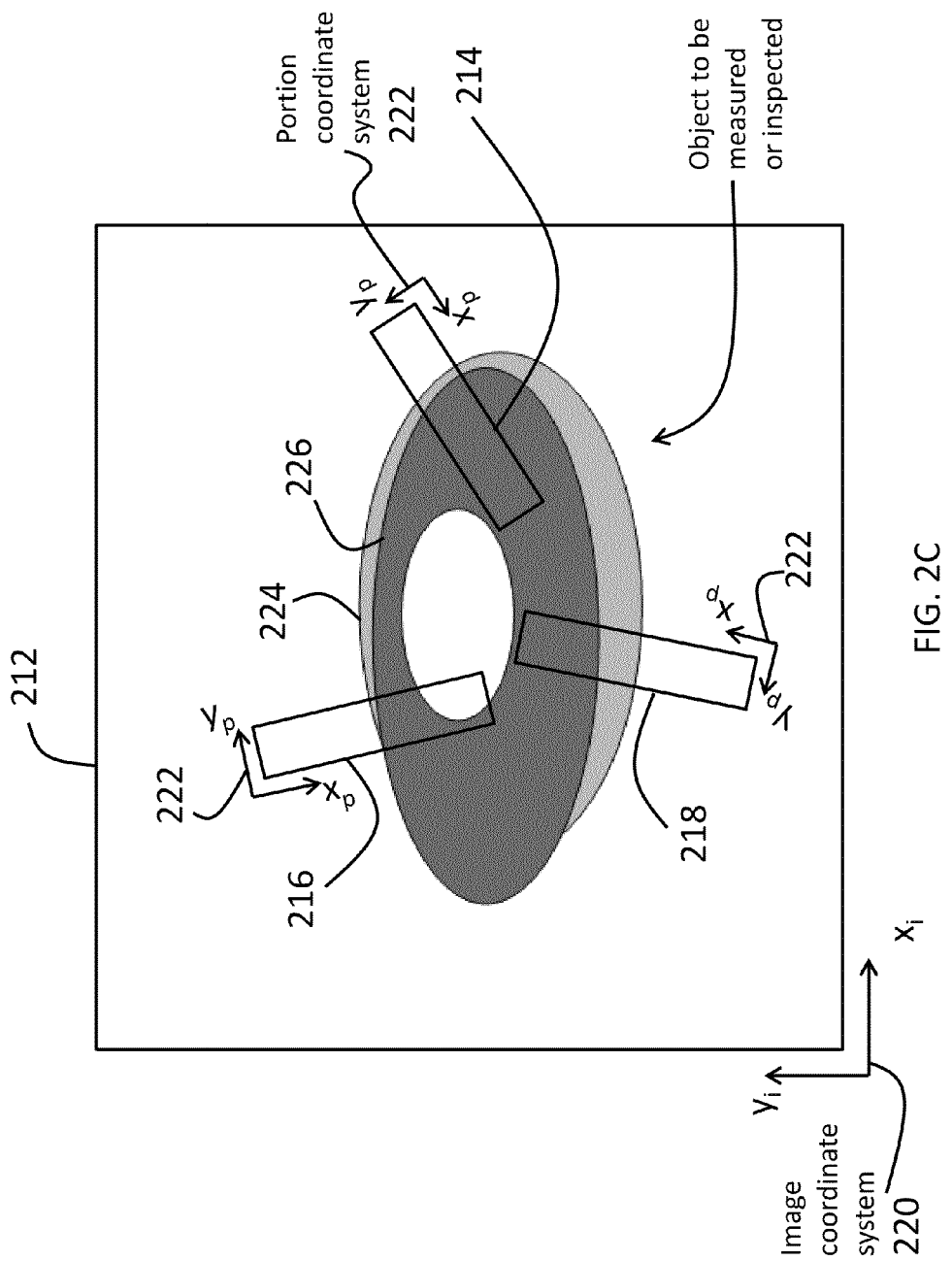
FIG. 2C illustrates an image of an object and the selection of an image portion for purposes of edge detection, according to an example of implementation of the present invention.

In order to clarify the concepts of image portion and its orientation, FIG. 2C illustrates an example of an image 212 for which different possible portions 214, 216, 218 may be selected for edge presence analysis. Note that although only three image portions are shown in FIG. 2C, more or less portions, as well as various different portions, could be selected when analysing image 212 for the presence of edges. While the image 212 is itself associated with an image coordinate system 220, each portion 214, 216, 218 is associated with a respective portion coordinate system 222. Each portion coordinate system 222 has a respective x-axis and y-axis, which differ from one portion coordinate system 222 to another, as well as from the x-axis and y-axis of the image coordinate system 220. An edge within an image portion, as well as its various edge parameters or characteristics, may be identified or located on a basis of the respective portion coordinate system 222 (i.e. having a position or positions defined by portion location coordinates $(x_p, y_p)$). However, portion location coordinates may be translated into coordinates $(x_i,$ $y_i$) of the image coordinate system 220, thereby identifying and/or locating the edge and edge parameters on a basis of the image coordinate system 220.

As seen in FIG. 2C, each portion 214, 216, 218 is characterized by a respective orientation within the image 212, where these orientations differ from one portion to another. The particular orientation selected for an image portion may depend on the orientation of the edge to be detected within the portion, since an edge detection algorithm or technique applied to the image portion may be more or less successful depending on the orientation of the portion with respect to the orientation of the edge within the portion. In a non-limiting example of implementation, a particular image portion is selected with a specific orientation that aligns substantially in parallel the y-axis of the portion coordinate system 222 with the orientation of the edge to be detected within the particular image portion. Thus, in the example shown in FIG. 2C, each portion 214, 216, 218 is oriented such that its respective y-axis 222 is substantially parallel with an edge (224 or 226) to be detected therein. Note that for multiple edges within a same image portion, each different edge may be most accurately identified using a different orientation of the portion within the image.

As shown in FIG. 2C, a portion 214, 216, 218 to be analysed may be relatively small in width and, as for most applications, may correspond to a small region of the entire image 212. However, image portions to be selected for analysis may be characterized by various different sizes, the size varying on a basis of the type and graphic characteristics of the image itself and/or on a basis of the application implementing the edge detection algorithm. As mentioned above, an image portion selected for analysis may also comprise the entire image, for example in a case where the image acquired and received for processing by the edge detection algorithm consists solely of a portion of an image, such as shown in the example of FIG. 2D. Another example in which the image portion selected for analysis may comprise the entire image is one in which the image has a very delimited straight edge that can be located solely by its position $x_i$ along the x-axis of the image coordinate system, such as shown in the example of FIG. 2E.

Note that the selection of a portion or portions of an image to be analysed for the presence of an edge may be effected manually by a user or operator, or automatically by an algorithm implemented by the computing unit, on a basis of various predefined conditions, such as for example a region of interest, an intensity level contrast or the type of application. Furthermore, any such algorithm may be configured to perform automatic portion selection on a basis of user-defined portion selection for a template image or on basis of pre-processing analysis of the image. Similarly the orientation of a portion or portions of an image to be analysed for the presence of an edge may be effected manually by a user or operator during an initialisation step or automatically by an algorithm implemented by the computing unit on a basis of pre-processing analysis of the image.

Thus, in an edge detection system, once an image is acquired and a portion of this image is selected for analysis to identify an edge therein, a specific edge detection algorithm is applied by the computing unit to the selected portion. In a broad embodiment of the present invention, this edge detection algorithm is based on an intensity profile representation (also referred to herein as an intensity profile) for the portion, as well as a corresponding intensity variation. It is by analysing this intensity profile and corresponding intensity variation of the image portion that the edge or edges within that portion may be identified, as discussed below.

FIG. 2B illustrates a one-dimensional intensity profile 208 taken along an x-axis of a coordinate system associated with an image portion. In order to determine or calculate the intensity profile 208 of an image portion, the image portion must first be rendered as a monochromatic image or a gray scale image (if not already rendered by the camera), the intensity profile 208 being a one-dimensional function I(x) indicative of a pixel color or pixel brightness intensity level for each position x along the x-axis of the coordinate system (also referred to herein as x-axis) of the image portion 206. Thus, the intensity profile 208 is a projection along the y-axis of the coordinate system (also referred to herein as y-axis) of each column of pixels within the image portion (there being one pixel column for each position on the x-axis), which means that pixel intensities in each pixel column are added up to obtain a total pixel intensity per position along the x-axis.

Figure 3:
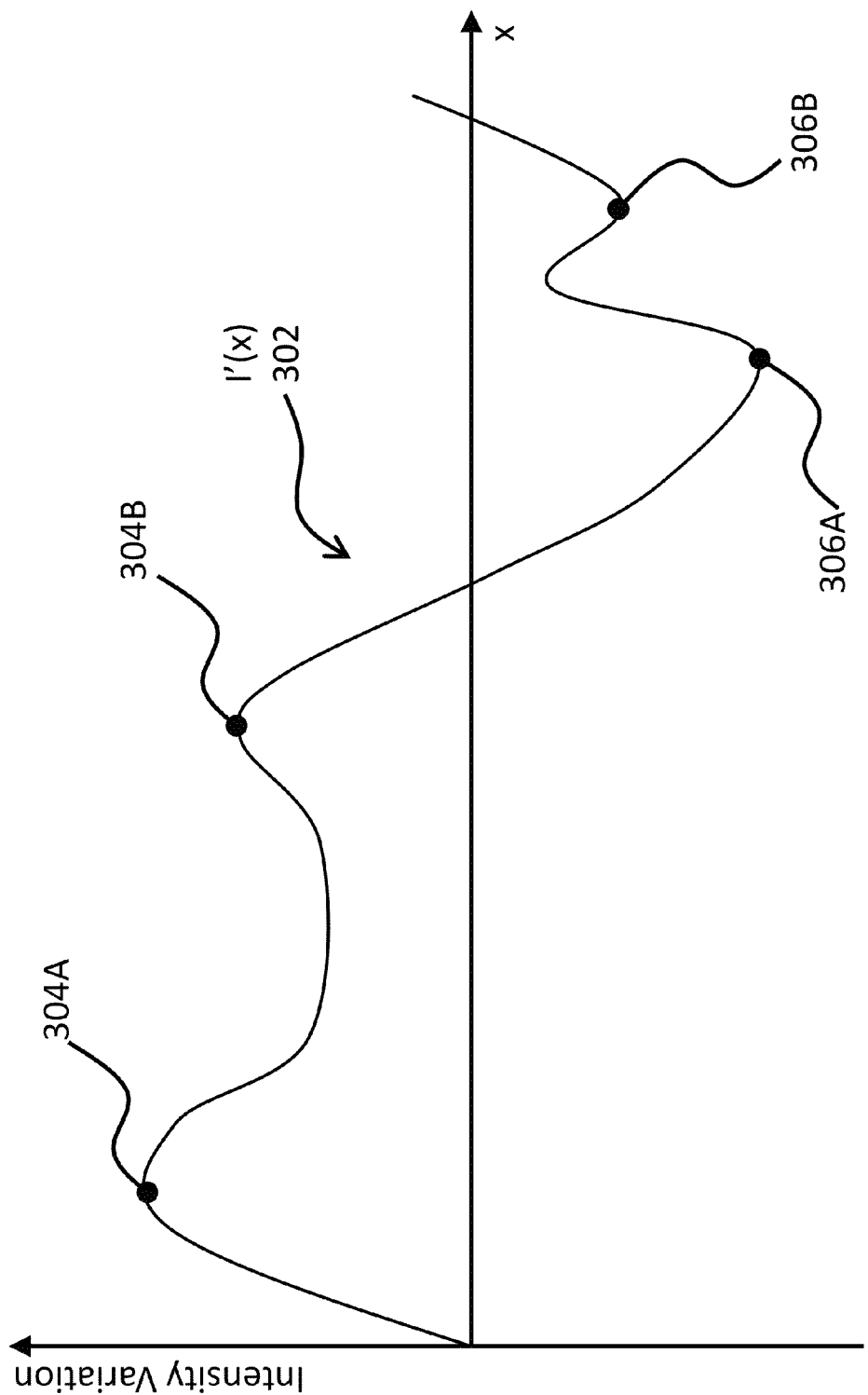
FIG. 3 illustrates an example of a slope (or intensity variation) curve corresponding to an intensity profile representation of an image portion.

FIG. 3 illustrates an intensity variation 302 corresponding to an intensity profile of an image portion. This intensity variation 302 is the first derivative of the intensity profile and is thus indicative of the slope I'(x) of the intensity profile for successive positions x along the x-axis. In other words, the first derivative of the intensity profile representation indicates the pixel intensity variation within the image portion, each slope point on the intensity variation curve 302 representing the level of pixel intensity variation at the respective position x along the x-axis of the image portion. The intensity variation curve 302 comprises peaks and valleys and ranges through a variety of positive and negative slope values. Peaks having a positive slope value, such as points 304A and 304B of the intensity variation 302, are indicative of a sudden change in brightness or in color intensity from dark to light at the corresponding position along the x-axis. The sudden change in intensity from dark to light is referred to herein as a positive intensity variation and may be indicative of a positive edge. Valleys having a negative slope value, such as points 306A and 306B of the intensity variation 302, are indicative of a sudden change in brightness or in color intensity from light to dark at the corresponding position along the x-axis. The sudden change in intensity from light to dark is referred to herein as a negative intensity variation and may be indicative of a negative edge.

Note that the intensity variation for an image portion may be computed using a first derivative filter, such as a Euler filter, a Prewitt filter or a Shen-Castan filter, among other possibilities. In existing edge detection systems, a processing unit may be adapted to apply one or more of these filters to a selected image portion for computing the intensity profile representation and corresponding intensity variation for the image portion, in the course of analysing the portion to detect an edge therein.

Specific to the present invention, there is provided a novel method for identifying an edge in a portion of an image, on a basis of the variation of an associated intensity profile for the respective portion. Basically, in a broad embodiment of the invention, a set of edge candidates (i.e. potential edges) is identified, each edge candidate corresponding to a position x along the x-axis of the image portion at which the intensity variation is a local extremum (i.e. a local maximum or a local minimum). A local threshold is calculated for each edge candidate and is used to determine if the respective extremum of the intensity variation is in fact indicative of an actual edge within the image portion, as will be discussed in further detail below. For each actual edge identified in the image portion, a plurality of characteristics or parameters of the respective edge may be determined and output as identification of the edge.

Figure 4A:
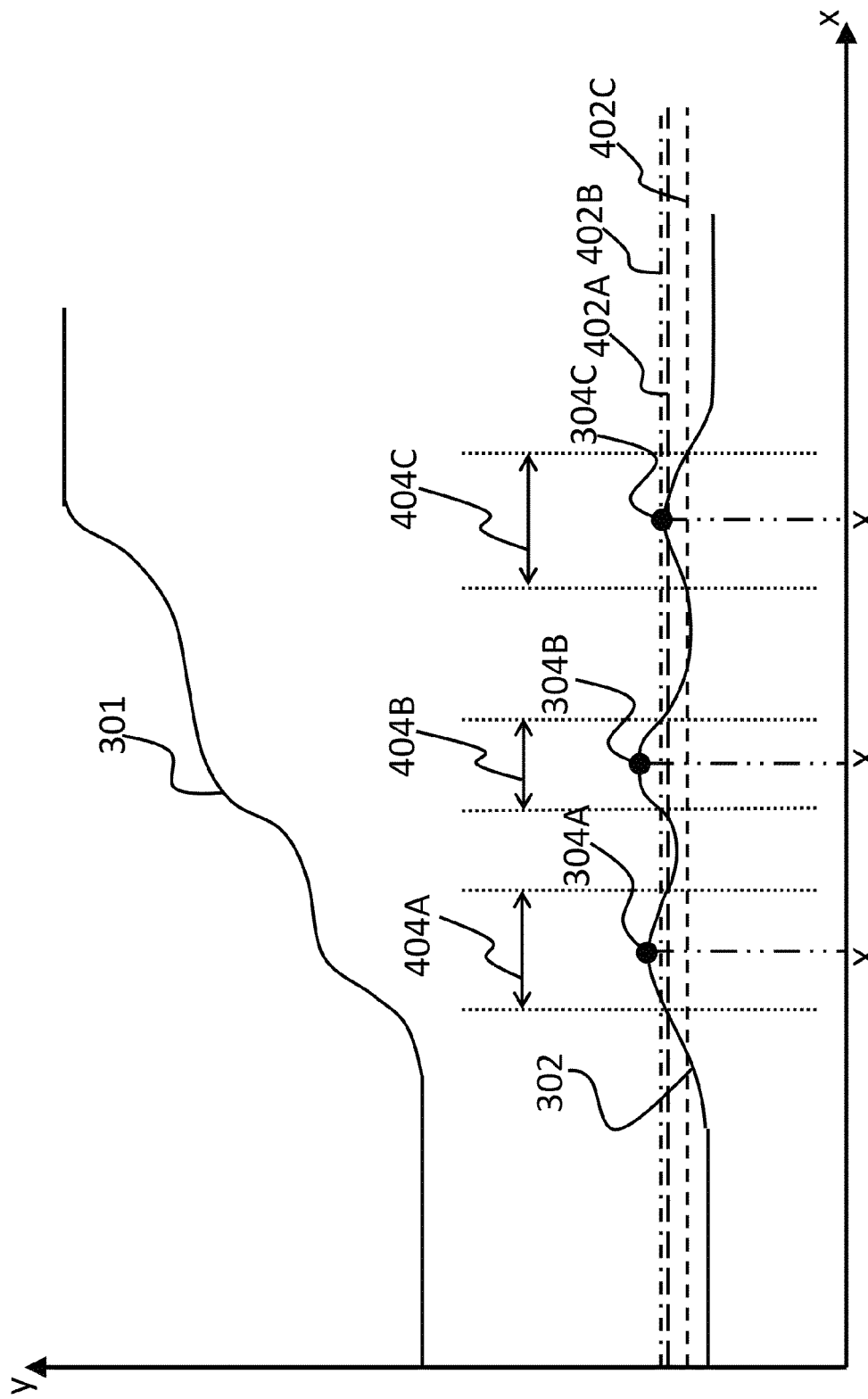
FIG. 4A illustrates an intensity profile and corresponding intensity variation for an image portion, with peaks and valleys identified at certain positions along the x-axis, according to a non-limiting example of implementation of the present invention.

FIG. 4A illustrates the application of the novel edge detection method to an example of an intensity profile representation 301 and associated intensity variation curve 302 computed for a selected image portion, according to a non-limiting example of implementation of the present invention. In the course of analysing the image portion for the presence of edges, three positions $X_A$, $X_B$ and $X_C$ are identified along the x-axis, corresponding to three peaks of the intensity variation 302, notably peaks 304A, 304B and 304C. Each peak corresponds to a local maximum, in that the intensity variation at the respective position x along the x-axis is higher than the intensity variation at the preceding position x−1 and higher or equal than the intensity variation at the following position x+1. The positions $X_A$, $X_B$ and $X_C$ are thus identified as corresponding to edge candidates for the image portion.

A local threshold (represented by lines 402A, 402B and 402C) is computed for each respective edge candidate's position $X_A$, $X_B$ and $X_C$ on a basis of a predefined, constant slope tolerance, and used to determine if the particular peak in the intensity variation 302 is indicative of an actual edge within the image portion. More specifically, for each identified position $X_A$, $X_B$, $X_C$, a respective local threshold 402A, 402B, 402C is computed by subtracting the slope tolerance from the slope value (i.e. the intensity variation value) at the respective position along the x-axis. The difference of this subtraction is an intensity variation value (at position y on the y-axis) corresponding to the respective local threshold value, where graphically the local threshold takes the form of a horizontal line crossing the intensity variation 302 at the position y.

In one example, in order to be able to use a computed local threshold to identify an edge candidate at position x with an actual edge, this local threshold must be crossed by the intensity variation curve 302 on either side of the edge candidate position x. More specifically, there must be positions x−j and x+k along the x-axis at which the intensity variation in the image portion is lower than the local threshold.

Accordingly, the local threshold used to analyse a particular edge candidate corresponds to an indication of by how much the intensity variation (or slope) needs to vary from the intensity variation value at the respective extremum, in order for the edge candidate to be considered an actual edge. Thus, the smaller the slope tolerance used to set this local threshold, the less the variation needed in the intensity variation at an extremum for the edge candidate to be considered an actual edge, and the greater the sensitivity of the local threshold-based edge detection algorithm.

Note that, for a given portion of an image to be analysed for the presence of an edge, a single slope tolerance is set or selected by a user for the entire portion. Thus, since the slope tolerance is constant for all of the edge candidates identified within an image portion, the local thresholds computed for the edge candidates of the portion will vary according to the slope or intensity variation value of each edge candidate. In other words, the local threshold used to determine if an edge candidate of an image portion is to be identified as an actual edge will vary from one extremum of the intensity variation to another, since it depends from the intensity variation value at each respective extremum position. In the example shown in FIG. 4A, each position $X_A$, $X_B$, $X_C$ is characterized by a different intensity variation value 304A, 304B and 304C, such that the subtraction of a same slope tolerance from each of these different intensity variation values results in a different local threshold 402A, 402B, 402C for each peak.

Advantageously, since the slope tolerance applied by the edge detection algorithm may be set or selected by a user upon configuration or initiation of the algorithm or system, it is possible for a user to customize the sensitivity of the edge detection algorithm for a particular application, type of image, type of edge(s) in a portion, etc. For example, in the case of the image portion profiled in FIG. 4A, in order to be able to detect all three peaks of the intensity variation 302 and to identify each one as an actual edge in the image portion, a user would select an appropriate slope tolerance to be applied by the algorithm.

Although not shown in the example of FIG. 4A, valleys or minima in the intensity variation may also be identified as potential edge candidates, each valley corresponding to a local minimum in that the intensity variation at the respective position along the x-axis is lower than the intensity variation at the preceding position x−1 and lower or equal than the intensity variation at the following position x+1. Similar to the case of a local maximum, a local threshold is computed for each local minimum by adding the predefined slope tolerance to the slope value (i.e. the intensity variation value) at the respective position along the x-axis, where this local threshold can then be used to analyse whether or not the respective edge candidate at the local minimum position is to be identified as an actual edge within the image portion.

Once computed, the local threshold for an edge candidate at an extremum of the intensity variation defines a boundary region for the respective edge candidate. This boundary region extends on either side of the position of the respective extremum along the x-axis, more particularly between the x-axis positions (x−j and x+k) at which the local threshold line is crossed by the intensity variation curve 302. In the example of FIG. 4A, each local threshold 402A, 402B, 402C defines a respective boundary region 404A, 404B, 404C corresponding to positions $X_A$, $X_B$ and $X_C$ of the edge candidates.

Once a local threshold has been computed and a corresponding boundary region defined for an edge candidate, a verification is performed to determine whether or not the respective edge candidate corresponds to an actual edge in the image portion. In a broad embodiment of the present invention, an edge candidate is determined to be an actual edge of the image portion if the absolute value of the intensity variation value (i.e. slope value) at the respective x-axis position of the edge candidate is greater or equal to the absolute value of the intensity variation value at all of the other x-axis positions within the respective boundary region defined for the edge candidate. In other words, in addition to being a local extremum within its respective boundary region, the edge candidate must also be the global extremum (i.e. the highest peak or the lowest valley) in the respective boundary region. If an identified edge candidate (peak or valley of the intensity variation) does not satisfy this condition (i.e. is not the global extremum within the respective boundary region), the edge candidate is determined not to be an actual edge of the image portion.

Continuing with the example shown in FIG. 4A, since each peak 304A, 304B, 304C satisfies the condition of being a global maximum within the respective boundary region 404A, 404B, 404C, the verification would determine that all positions $X_A$, $X_B$, $X_C$ correspond to positions of actual edges of the image portion. Advantageously, by using a different local threshold to analyse each edge candidate, where each local threshold is dependent on the intensity variation value of the respective edge candidate, it is possible to adaptively determine the presence of an edge at a selected position along the x-axis of the image portion. It is also possible to identify all of the actual edges in an image portion even when dealing with an ambiguous intensity profile such as that shown in FIG. 4A (i.e. multiple potential edges of the same polarity within proximity of one another).

Upon verifying that an identified edge candidate corresponds to an actual edge within the image portion, the edge detection algorithm identifies the verified edge. In a specific, non-limiting example of implementation of the present invention, identification of a verified edge includes determining one or more of a plurality of characteristics (or parameters) of the edge. For example, identification of a verified edge may include determining a region containing the verified edge, where this region defines the beginning and end position of the respective intensity transition (or intensity change) within the image portion. Edge identification may also include determining one or more of an edge contrast (absolute difference between the intensity at the start and end of the edge), an edge location or position (inflexion point along the x-axis of the one-dimensional intensity profile and possibly a corresponding point along the y-axis), a strength of the edge (absolute value of the slope at the edge position), a polarity of the edge (sign of the first derivative at the inflexion point) and a width of the edge (distance between the start and end of the edge), among other possibilities. Thus, an identification of an edge determined and output by the computing unit may include one or more of these different possible edge parameters.

As mentioned above, the position of an edge or an edge parameter may be defined and identified by a position along an x-axis in either the portion coordinate system or the image coordinate system. Furthermore, a single pixel or a grouping of pixels projected onto the x-axis may be associated to the respective position along the x-axis. When a grouping of pixels is associated to a position x (along the x-axis), the method may further determine a y coordinate in order to locate the edge along the y-axis. For example, the middle of the portion of the image along the y-axis may be used as a y position for the detected edge.

In a non-limiting example of implementation, the computing unit stores in an array a list of identifiers corresponding to a plurality of verified edges within the image portion. The computing unit may then output the array of identifiers for further analysis. For each verified edge, the identifier may include an edge region, an edge position, an edge contrast, an edge strength, etc. In another non-limiting example, the computing unit automatically outputs an identification of an actual edge as soon as it has been detected and verified. The output of the identification may be done on a position-by-position basis of the analysed intensity variation.

Note that, although in the above discussion of a novel method for identifying edges in an image portion it is only the extrema of the intensity variation that are identified as edge candidates and that then undergo the local threshold-based edge detection analysis, it is also possible to apply the edge detection analysis to the intensity variation at each position x along the x-axis, regardless of whether or not these positions correspond to extrema of the intensity variation. For instance, as illustrated in FIG. 4B, for each sequential position along the x-axis from left to right, the respective point on the intensity variation curve 302 is selected as an edge candidate and analysed for the presence of an actual edge using a computed local threshold. In the graph of FIG. 4B, encircled points (such as point 405) have already been analysed and selected point 406, for which an associated local threshold 408 is calculated, is the point that is being analysed.

Figure 5A:
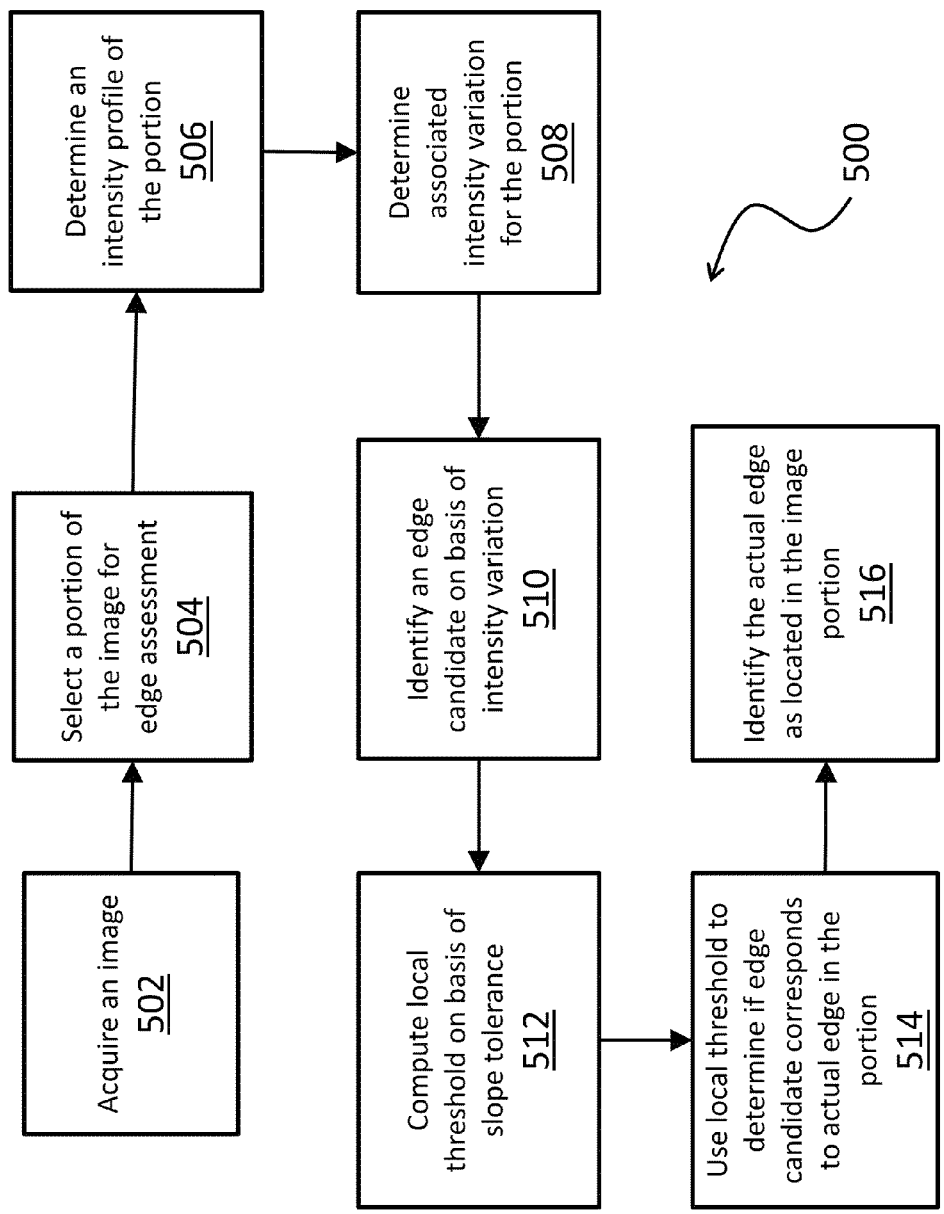
FIG. 5A is a flow diagram illustrating an edge detection method, according to a broad embodiment of the present invention.

FIG. 5A is a flow diagram illustrating an edge detection method 500 for identifying with a computing unit an edge in a portion of an image, according to a broad embodiment of the present invention. At step 502, an image is acquired. At step 504, a portion of the image is selected to be analysed for the presence of an edge. At step 506, an intensity profile associated with the selected image portion is computed, and the associated intensity variation is determined at step 508. At step 510, an edge candidate is identified based on the intensity variation for the image portion. A local threshold is then computed for the edge candidate at step 512, at least in part on the basis of a slope tolerance. This local threshold is used at step 514 to determine if the edge candidate corresponds to an actual edge in the image portion. If the determination is that the edge candidate is indeed an actual edge of the image portion, the edge is identified at step 516, where this identification may include determining characteristics of the edge.

Figure 5B:
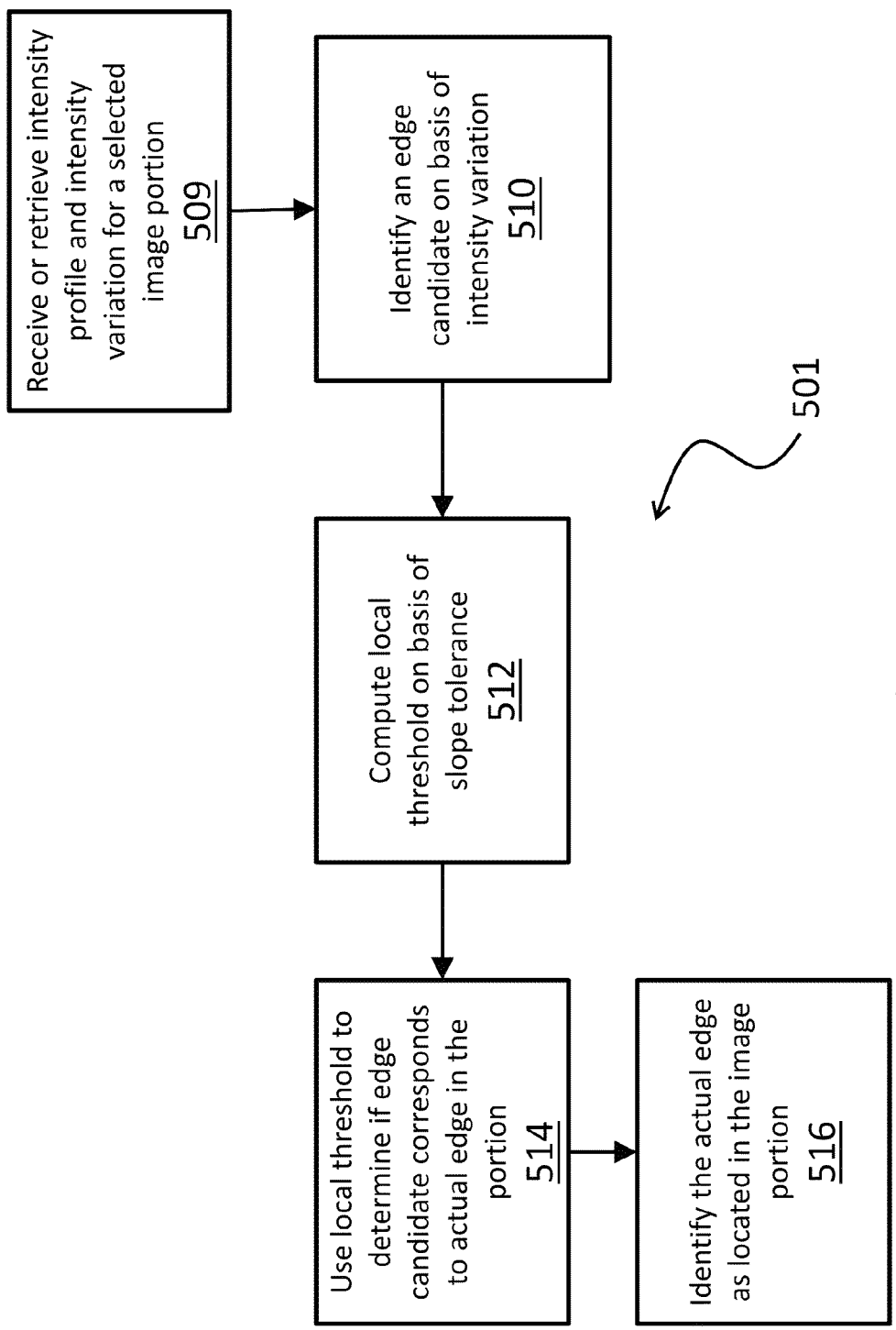
FIG. 5B is a flow diagram illustrating an edge detection method, according to another embodiment of the present invention.

In a variant embodiment of the present invention, the intensity profile associated with an image portion to be analysed for the presence of an edge, as well as the corresponding intensity variation, have been previously calculated (or determined) and are thus already available to the computing unit implementing the edge detection method. The intensity profile and its corresponding intensity variation may have been calculated by the computing unit implementing the edge detection method or by a separate processing unit and stored in a storage medium accessible by the computing unit. FIG. 5B is a flow diagram illustrating a method 501 for identifying with a computing unit an edge in a portion of an image, according to such a variant embodiment of the present invention. The method 501 includes receiving or retrieving a computed intensity profile and corresponding intensity variation for an image portion to be analysed for the presence of an edge, at step 509. At step 510, an edge candidate is identified based on the intensity variation for the image portion. A local threshold is then computed for the edge candidate at step 512, at least in part on the basis of a slope tolerance. This local threshold is used at step 514 to determine if the edge candidate corresponds to an actual edge in the image portion. If the determination is that the edge candidate is indeed an actual edge of the image portion, the edge is identified at step 516, where this identification may include determining characteristics of the edge.

Figure 6:
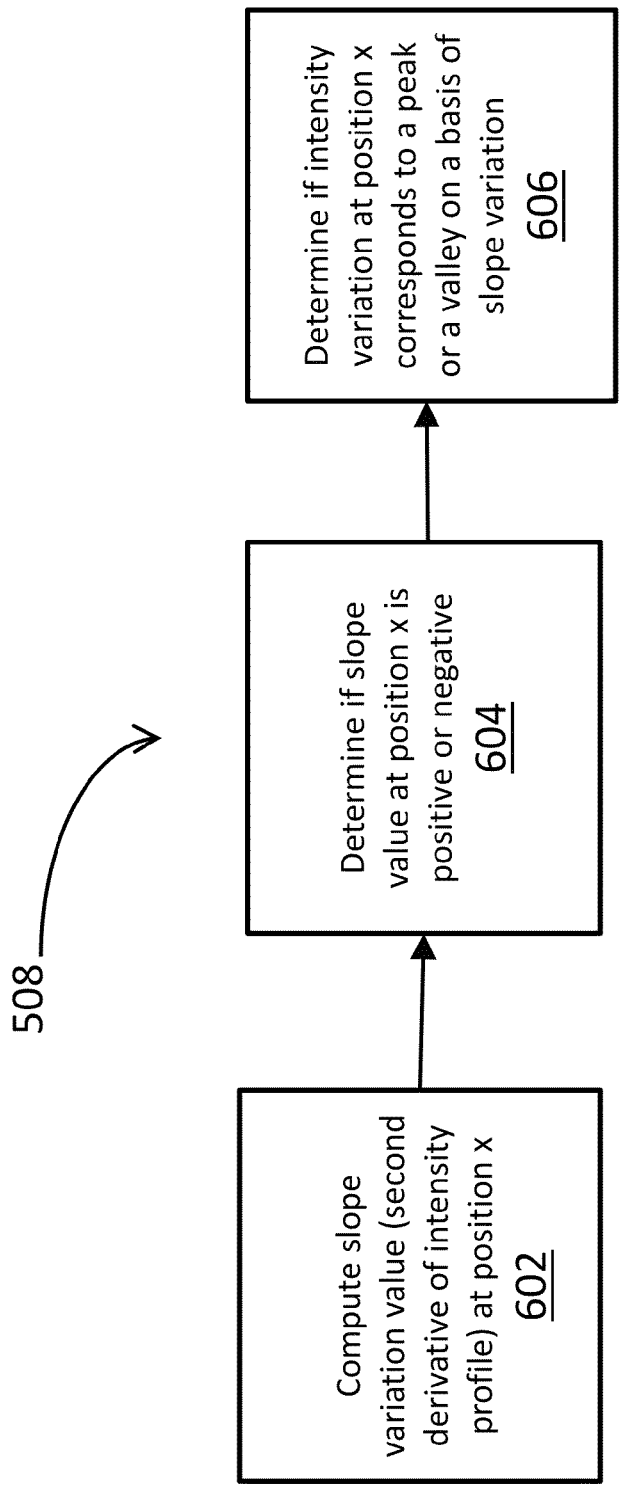
FIG. 6 is a flow diagram illustrating a method for determining if a particular position along the x-axis corresponds to a peak or a valley of the intensity variation of an image portion, according to a non-limiting example of implementation of the present invention.

In a variant example of implementation of the present invention, edge candidates corresponding to extrema of the intensity variation are determined in a basis of the second derivative of the intensity profile (i.e. the slope variation), while the first derivative of the intensity profile (i.e. the slope or the intensity variation) at each position along the x-axis corresponding to an identified extrema is used to determine if the respective extrema is a peak or a valley. More specifically, as illustrated in the flow diagram of FIG. 6, in order to determine if a particular position along the x-axis corresponds to an extrema of the intensity variation, the second derivative of the intensity profile (i.e. the slope variation) at the particular x position is first determined at step 602. Next, the slope (or intensity variation) value at the particular x position is determined to be either positive or negative at step 604. For positive slope values, the method determines that the particular x position corresponds to a maximum or peak in the intensity variation at step 606 if the slope variation (i.e. second derivative of intensity profile) at the respective x position is equal to zero and the slope variation values at the immediately preceding and following x positions are respectively positive and negative (i.e. the intensity variation values at the immediately preceding and following x positions are both lower than the intensity variation value at the particular x position). For negative slope values, the method determines that the particular x position corresponds to a minimum or valley at step 606 if the slope variation (i.e. second derivative of intensity profile) at the respective x position is equal to zero and the slope variation values at the immediately preceding and following x positions are respectively negative and positive (i.e. the intensity variation values at the immediately preceding and following x positions are both greater than the intensity variation value at the particular x position).

Figure 7A:
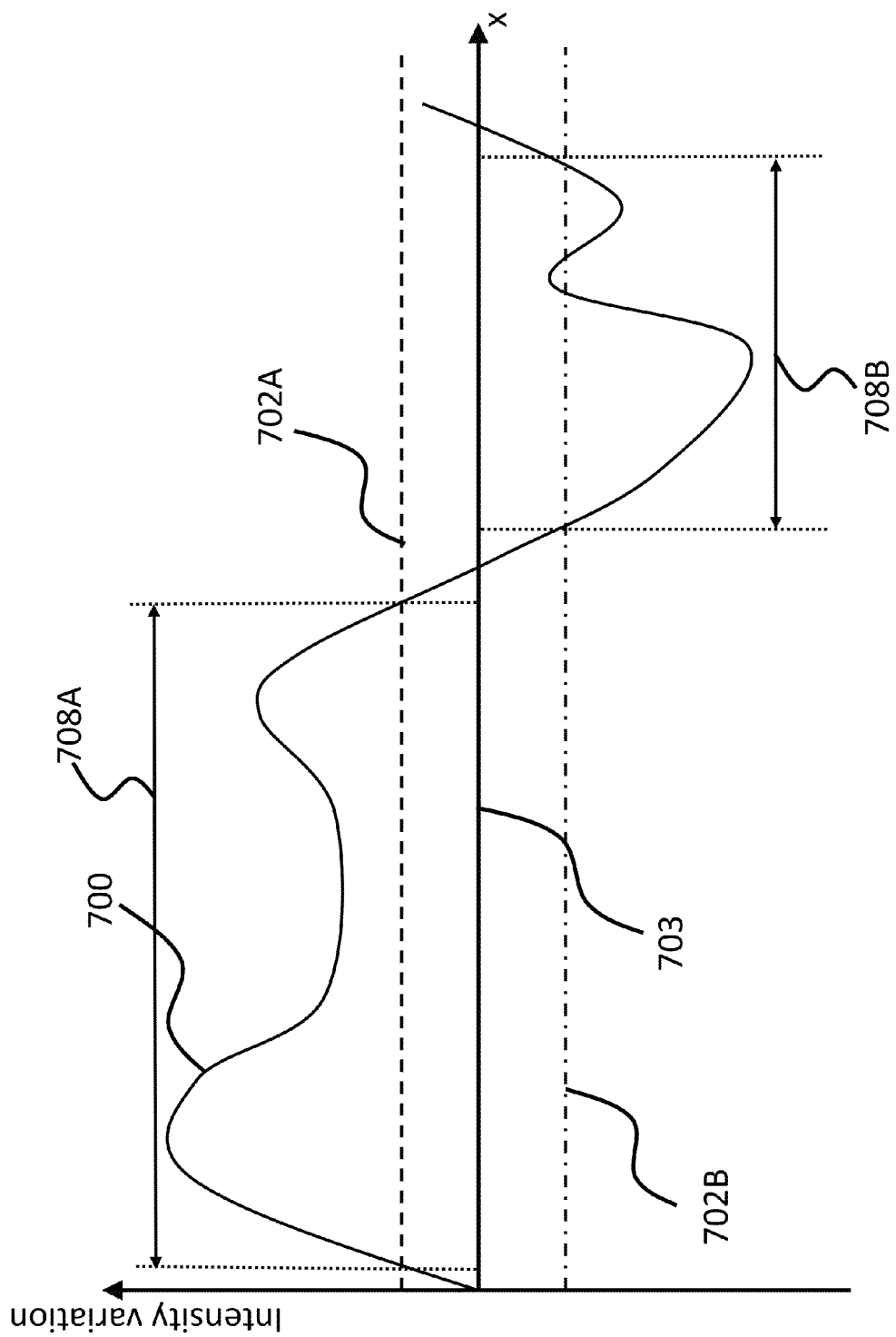
FIG. 7A illustrates the usage of a global threshold to determine the positions of edge candidates from the intensity variation of an image portion, according to another example of implementation of the present invention.

In yet another variant example of implementation of the present invention, an edge candidate may be identified on the basis of the intensity variation of an image portion and on the basis of a global threshold, such as global thresholds 702A and 702B shown in FIG. 7A. More specifically, the global thresholds 702A and 702B determine which points of the intensity variation 700 are selectable for edge assessment. The global threshold 702A is a global threshold for the positions having a corresponding positive slope on the intensity variation 700, only points having a positive slope value that is greater than the global threshold 702A being selectable for edge presence assessment. The global threshold 702B is a global threshold for the positions having a negative slope on the intensity variation 700, only points having a negative slope value that is smaller than the global threshold 702B being selectable for edge presence assessment.

Note that various methods for determining a global threshold exist, as discussed briefly above. In one non-limiting example, the global thresholds 702A and 702B of FIG. 7A are set at a predefined or user-specified percentage (e.g. 2%) of a maximum possible total intensity value that may be projected for a column or grouping of pixels onto the x-axis of the respective image portion. Thus, for a column of four pixels, if each pixel has a maximum possible intensity value of 255, the maximum possible total intensity value is: 4*255=1020. In this case, the global threshold value would be set to 2% of 1020=20.4. When the global threshold is applied for positive intensity variations, the calculated global threshold value is added to a zero intensity variation baseline 703. When the global threshold is applied for negative intensity variations, the calculated global threshold value is subtracted from the zero intensity variation baseline 703.

Figure 7B:
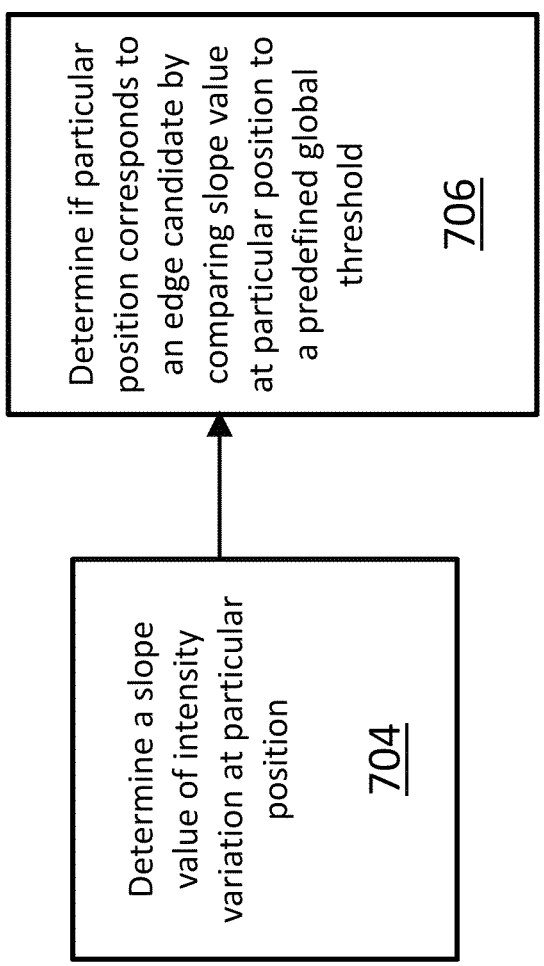
FIG. 7B is a flow diagram illustrating a method for identifying an edge candidate from the intensity variation of a selected image portion on a basis of a global threshold, according to a non-limiting example of implementation of the present invention.

FIG. 7B illustrates a method of identifying an edge candidate from the intensity variation of a selected image portion on the basis of a global threshold, as discussed above with regard to the prior art solution for edge detection. At step 704, a slope value of the intensity variation at a particular position is determined. At step 706, the slope value is compared to a predefined global threshold. If the slope value at the particular position is positive and if the slope value is greater than the global threshold at step 706, the particular position is identified as corresponding to an edge candidate. Alternatively, if the slope value at the selected position is negative and if the slope value is smaller than the global threshold at step 706, the particular position is identified as corresponding to an edge candidate. In the example illustrated in FIG. 7A, all points of the intensity variation 700 having a positive slope value that is greater than the global threshold 702A (set of points indicated by bracket 708A) may be selected one at a time for undergoing edge assessment to determine if the point corresponds to an actual positive edge in the image portion. Similarly, all points of the intensity variation having a negative slope value that is smaller than the global threshold 702B (set of points indicated by bracket 708B) may be selected one at a time for undergoing edge assessment to determine if the point corresponds to an actual negative edge in the image portion.

Thus, the present invention provides for the use of a local threshold in combination with or separate from a global threshold, for determining if edge candidates identified on the basis of the intensity variation of an image portion correspond to actual edges in the image portion. When a local threshold is used in combination with the global threshold, the local threshold is only computed and used to perform edge assessment for those positions identified by the global threshold as corresponding to edge candidates.

Figure 8:
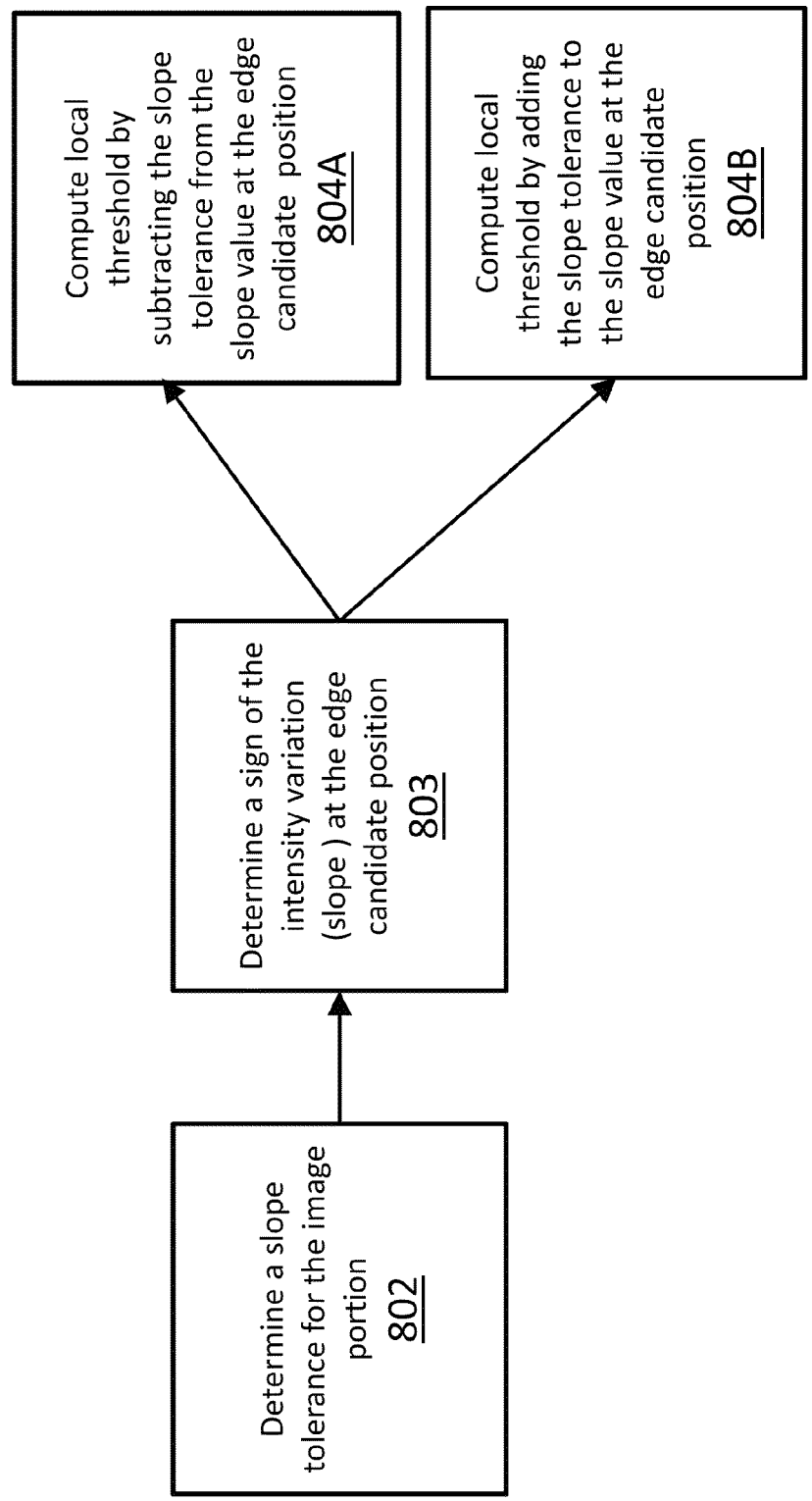
FIG. 8 is a flow diagram illustrating a method for computing a local threshold for an edge candidate position identified from the intensity variation of an image portion, according to a broad embodiment of the present invention.

FIG. 8 is a flow diagram illustrating a method for calculating a local threshold for an edge candidate position identified on the intensity variation curve of a selected image portion, according to an embodiment of the present invention. At step 802, a slope tolerance for the selected image portion is determined, where this slope tolerance may be set by a user. At step 803, a sign of the intensity variation (or slope) at the respective edge candidate position is determined. If the slope value at the edge candidate position is positive, the respective local threshold is calculated by subtracting the slope tolerance from the slope value at the edge candidate position, at step 804A. If the slope value at the edge candidate position is negative, the respective local threshold is calculated by adding the slope tolerance to the slope value at the edge candidate position, at step 804B.

In yet another variant example of implementation of the present invention, the slope tolerance used to compute a local threshold for a selected edge candidate may be a fixed value or a percentage of the slope value at the edge candidate position. For example, in FIG. 4A, for the edge candidate 304A, 2% of the slope value of edge candidate 304A is used as the slope tolerance, which is then subtracted from the slope value of the edge candidate 304A in order to compute the respective local threshold 402A.

Figure 9A:
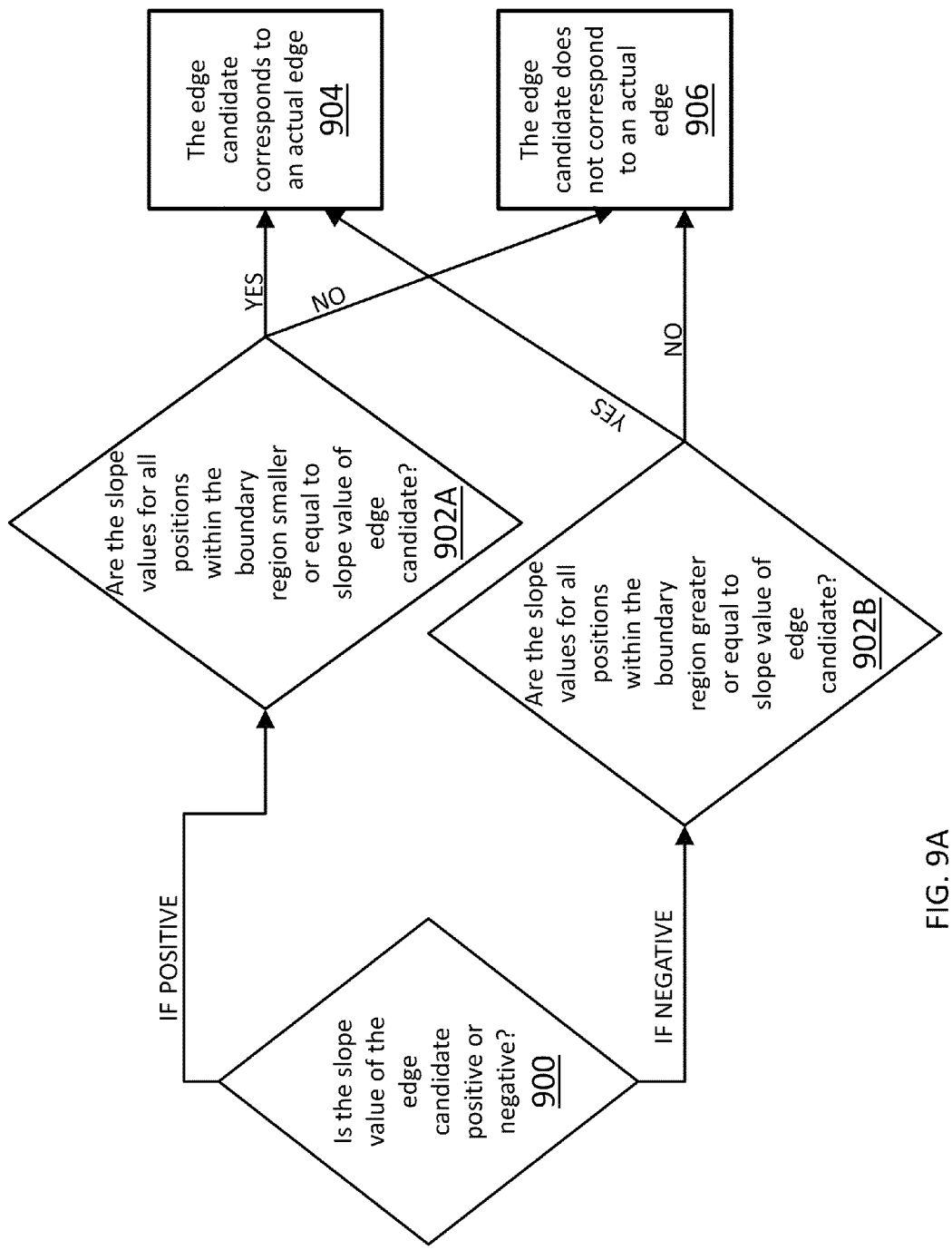
FIG. 9A is a flow diagram illustrating a method for determining if an edge candidate identified on the basis of the intensity variation of an image portion corresponds to an actual edge in the image portion, according to a broad embodiment of the present invention.

FIG. 9A is a flowchart illustrating a method for determining if an edge candidate identified on the basis of the intensity variation of an image portion corresponds to an actual edge in the image portion, according to an embodiment of the present invention. The determination is based on an analysis of a boundary region for the edge candidate, where this boundary region is defined by the local threshold computed for the edge candidate. More specifically, the boundary region extends on either side of the selected edge candidate's position x along the x-axis, between positions x−j and x+k at which the intensity variation curve crosses the respective local threshold of the edge candidate (i.e. the positions x-j and x+k at which the slope values are equal to the local threshold value). At step 900, a sign of the slope value of the edge candidate is determined to be either positive or negative. If the slope value of the edge candidate is positive, then at step 902A all the positions within the defined boundary region are verified to ensure that the respective slope values at these positions are smaller or equal to the slope value of the edge candidate. If so, at step 904, the edge candidate is determined to correspond to an actual edge of the image portion. If the slope value at one or more positions within the boundary region is greater than the slope value of the edge candidate, it is determined that the edge candidate does not correspond to an actual edge in the image portion at step 906.

If the slope value of the edge candidate is negative at step 900, then at step 902B all the positions within the boundary region are verified to ensure that the respective slope values at these positions are greater or equal to the slope value of the edge candidate. If so, at step 904, the edge candidate is determined to correspond to an actual edge of the image portion. If the slope value at one or more positions within the boundary region is smaller than the slope value of the edge candidate, it is determined that the edge candidate does not correspond to an actual edge in the image portion at step 906.

Therefore, in order for a selected edge candidate of an image portion to be identified as corresponding to an actual edge in the image portion (at step 904), the edge candidate must correspond to a global extremum (maximum or minimum) on the intensity variation curve within the boundary region.

Note that the determination that an edge candidate corresponds to an actual edge in the image portion at step 906 may include identifying the edge, as well as possibly generating and outputting an identification of the respective edge as located in the image portion. As discussed above, the identification of an edge may include a determination of one or more characteristics or parameters of the edge, such as its position, its strength, its contrast, etc.

Figure 9B:
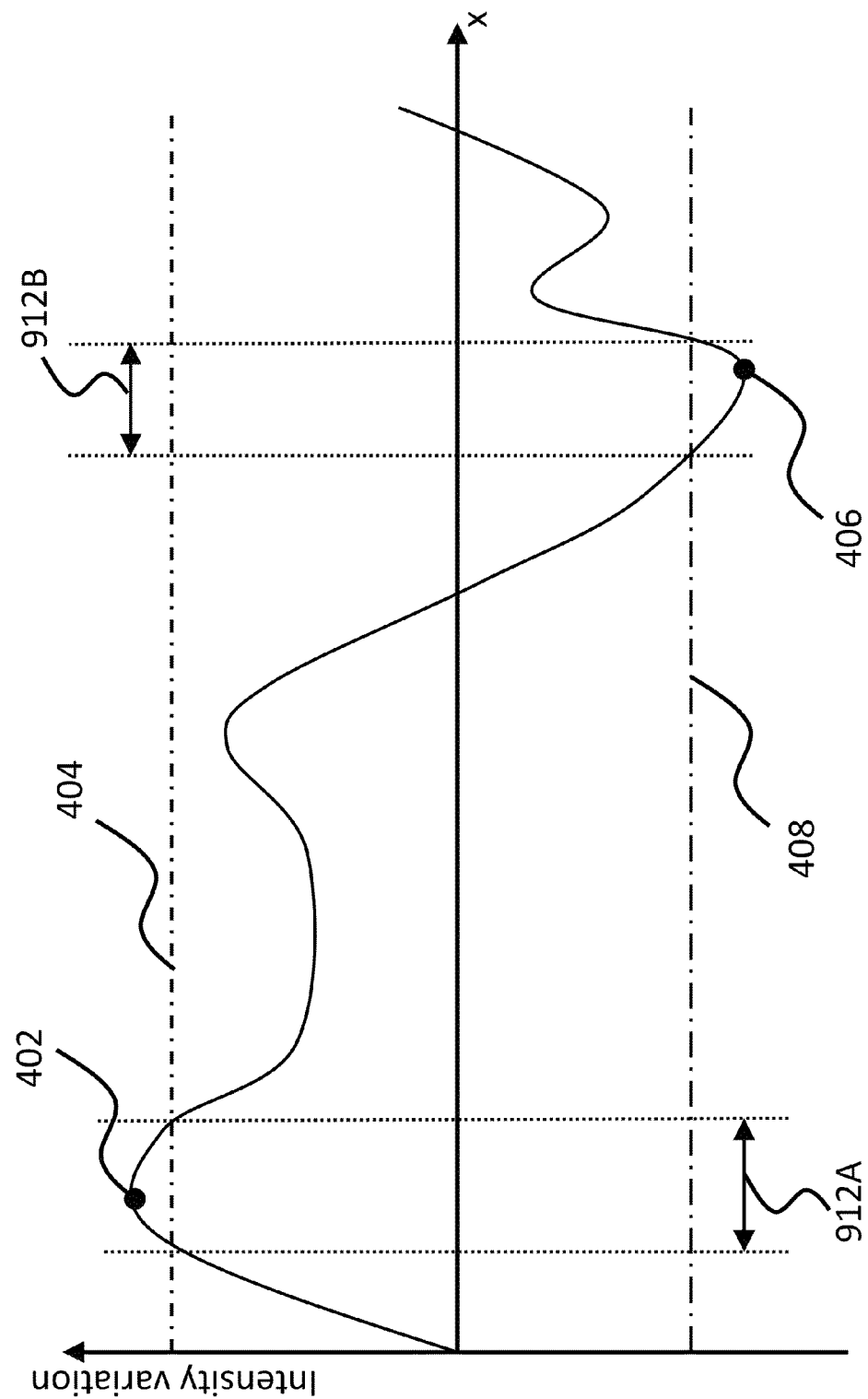
FIG. 9B illustrates a slope curve associated with an image portion and the usage of a local threshold to determine a boundary region for an identified edge candidate, according to a non-limiting example of implementation of the present invention.

In the non-limiting example of an intensity variation curve for a selected image portion shown in FIG. 9B, the edge detection method would determine that the edge candidate 402 does correspond to an actual positive edge in the image portion, since the slope values at all positions within the boundary region 912A defined by the local threshold 404 are smaller or equal to the slope value of the edge candidate 402. The method would also determine that the edge candidate 406 corresponds to an actual negative edge in the image portion, since the slope values at all positions within the boundary region 912B defined by the local threshold 408 are greater or equal to the slope value of the edge candidate 406.

Figure 9C:
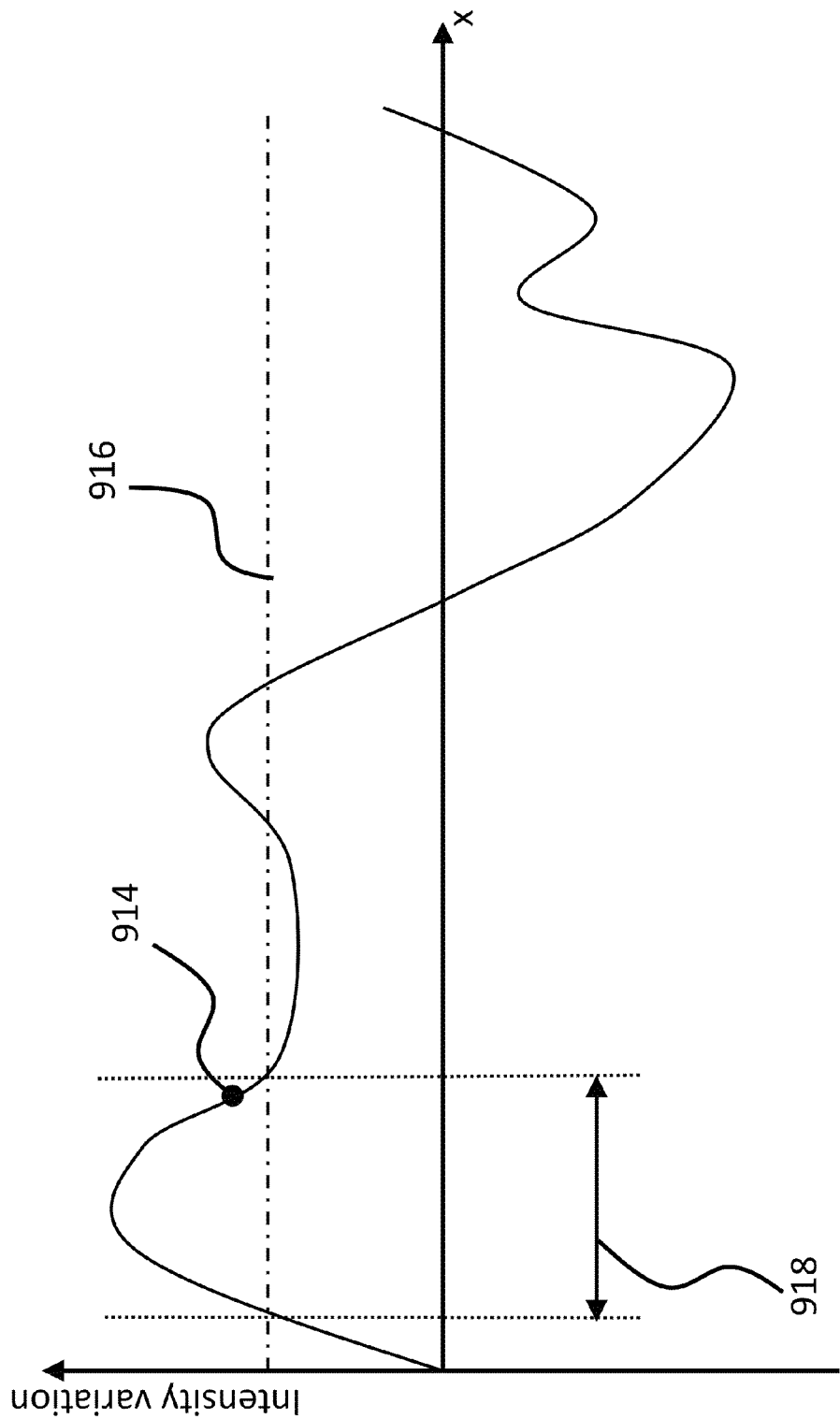
FIG. 9C illustrates a slope curve associated with an image portion and the usage of a local threshold to determine a boundary region for an identified edge candidate, according to another example of implementation of the present invention.

In the non-limiting example of an intensity variation curve for a selected image portion shown in FIG. 9C, the edge detection method would determine that the edge candidate 914 does not correspond to an actual edge in the image portion, since the slope value at at least one position within the boundary region 918 defined by the local threshold 916 is greater than the slope value of the edge candidate 914.

Figure 10A:
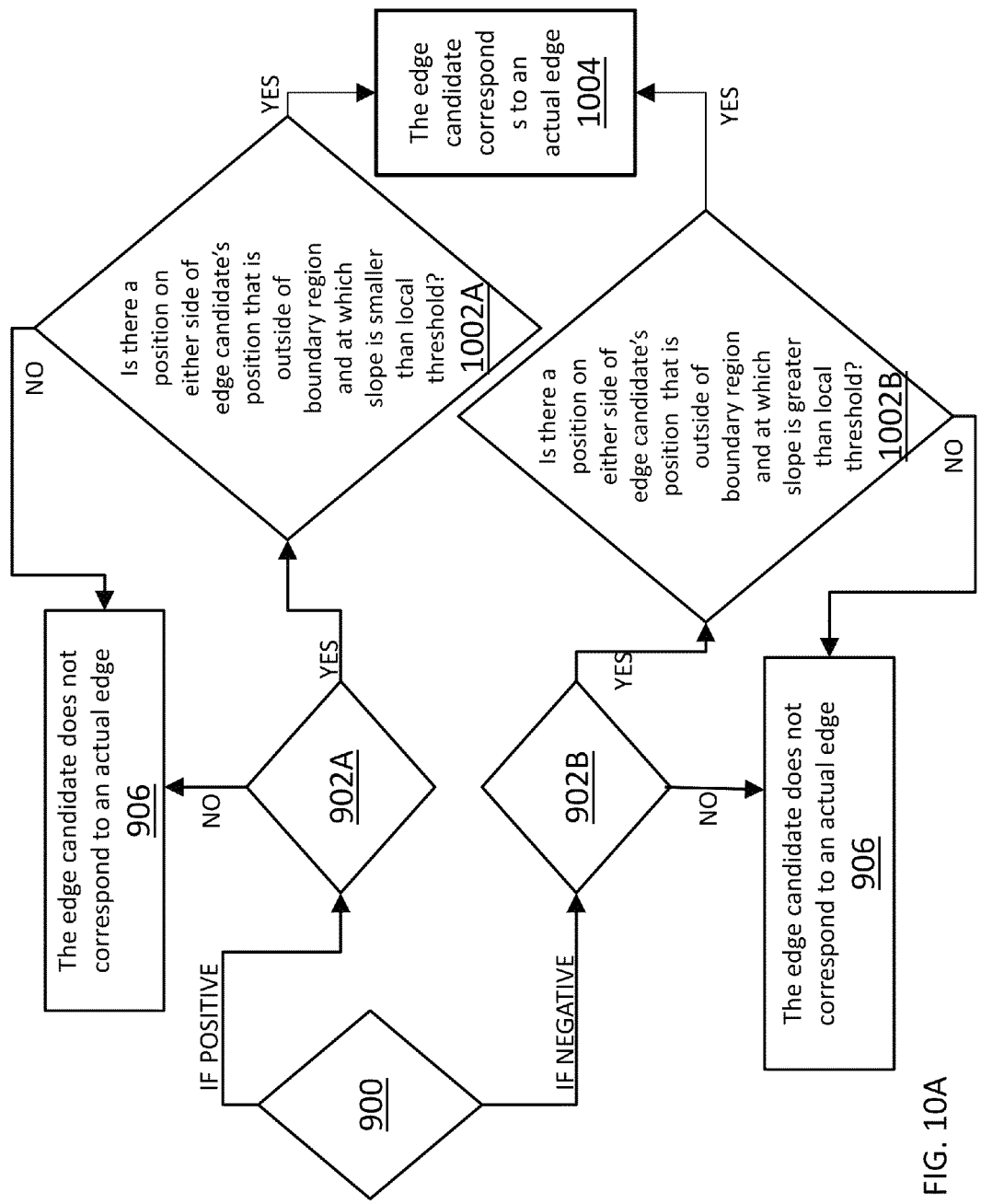
FIG. 10A is a flow diagram illustrating a method for determining if an edge candidate identified on the basis of the intensity variation of an image portion corresponds to an actual edge in the image portion, according to a variant embodiment of the present invention.

FIG. 10A is a flowchart illustrating a method for determining if a selected edge candidate, identified on the basis of the intensity variation of an image portion, corresponds to an actual edge in the image portion, according to another variant embodiment of the present invention. In the case of an edge candidate that has a corresponding positive slope value, the edge candidate is determined to correspond to an actual edge at step 1004: if all points within the associated boundary region defined by the local threshold have respective slope values (or intensity variation values) that are smaller or equal to the slope value of the edge candidate (at step 902A); and if there exists a position on either side of the edge candidate's position that is outside of the boundary region and at which the corresponding slope value is smaller than the local threshold (at step 1002A). Otherwise, it is determined that the edge candidate does not correspond to an actual edge in the image portion at step 906.

In the case of an edge candidate that has a negative slope value, the edge candidate is determined to correspond to an actual edge at step 1004: if all points within the associated boundary region defined by the local threshold have respective slope values that are greater or equal to the slope value of the edge candidate (at step 902B); and if there exists a position on either side of the edge candidate's position that is outside of the boundary region and at which the corresponding slope value is greater than the local threshold (at step 1002B). Otherwise it is determined that the edge candidate does not correspond to an actual edge in the image portion at step 906.

Note that, in the variant method of edge detection illustrated in FIG. 10A, the additional condition of checking for positions outside of the boundary region at which the corresponding slope values are smaller (or greater) than that of the local threshold allows to verify that the slope of the intensity profile (i.e. the intensity variation) changes or varies sufficiently on either side of the edge candidate point's position for the edge candidate to be identified as an actual edge.

Figure 10B:
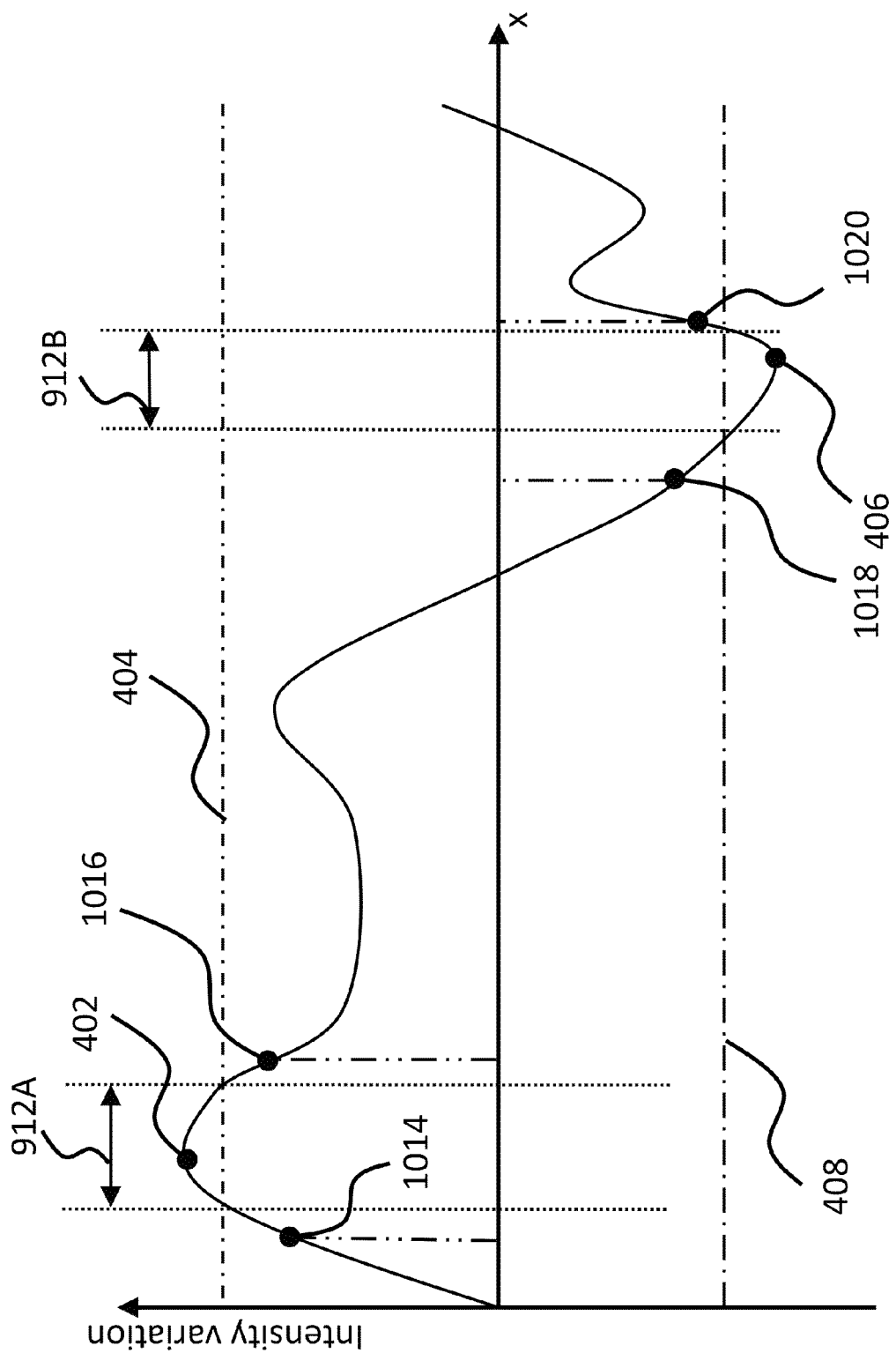
FIG. 10B illustrates a slope curve associated with an image portion and the usage of a local threshold to determine a boundary region and an outside region for an identified edge candidate, according to a non-limiting example of implementation of the present invention.

In the non-limiting example of an intensity variation curve of a selected image portion shown in FIG. 10B, the variant method illustrated in FIG. 10A would identify the edge candidate 402 as corresponding to an actual edge since all points within the associated boundary region 912A (defined by the local threshold 404) have respective slope values that are smaller than the slope value at the edge candidate 402, and there is a position on either side of the edge candidate's position 402 that is outside of the boundary region 912A and at which the corresponding slope value is smaller than the local threshold 404, such as at positions 1014 and 1016.

The method would also identify the edge candidate 406 as corresponding to an actual edge since all points within the respective boundary region 912B (defined by the local threshold 408) have respective slope values that are greater than the slope value of the edge candidate 406, and there is a position on either side of the edge candidate's position 406 that is outside of the boundary region 912B and at which the corresponding slope value is greater than the local threshold 408, such as at positions 1018 and 1020.

In yet another variant embodiment of the present invention, once an edge candidate is determined to correspond to an actual edge in the image portion, such that an actual edge has been located within the image portion being analysed, the method further comprises identifying or locating a beginning and end of the edge (i.e. an edge region) in the image portion. More specifically, location parameters for the edge within the image portion are identified.

Figure 13A:
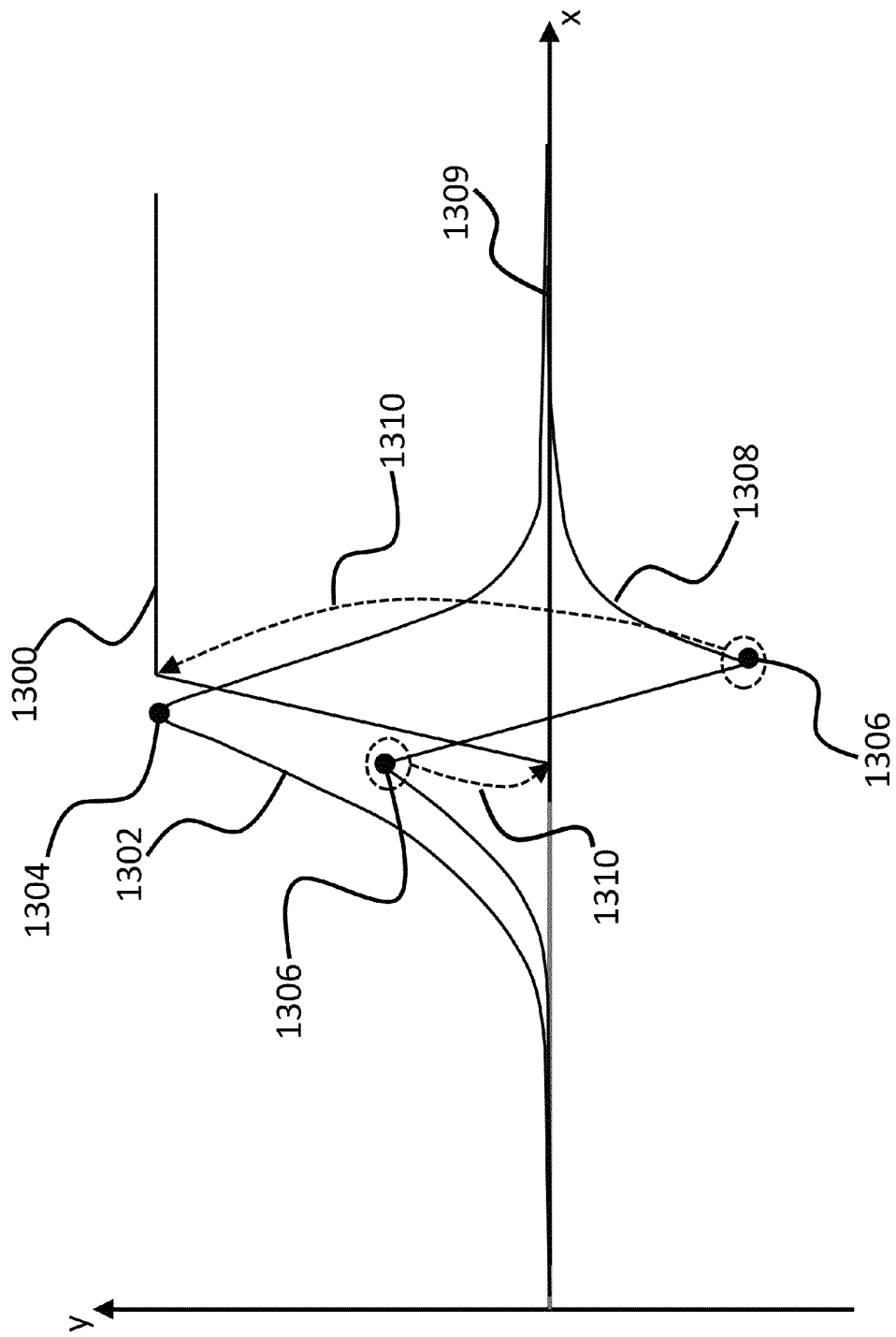
FIG. 13A is a graph illustrating the usage of a second derivative of the intensity profile of an image portion to determine the limits of an edge identified in the image portion, according to a non-limiting example of implementation of the present invention.

With reference to the exemplary graph of FIG. 13A, an intensity profile representation 1300 of an image portion is shown, along with the associated intensity variation 1302 (first derivative of the intensity profile) and slope variation 1308 (second derivative of the intensity profile). The peak 1304 of the intensity variation 1302 corresponds to an actual edge in the image portion. It is possible to identify the limits of this edge in the image portion (i.e. the beginning and end positions along the x-axis that delimit the edge within the image portion) using the slope variation 1308 of the intensity profile representation 1300 of the image portion. More specifically, as seen in FIG. 13A, the extrema 1306 of the second derivative 1308 of intensity profile 1300 correspond to points of maximum curvature in the intensity profile. The positions of these points of maximum curvature 1306 along the x axis 1309 of the portion coordinate system determine the limits of the edge in the image portion, as shown by arrows 1310.

Figure 14:
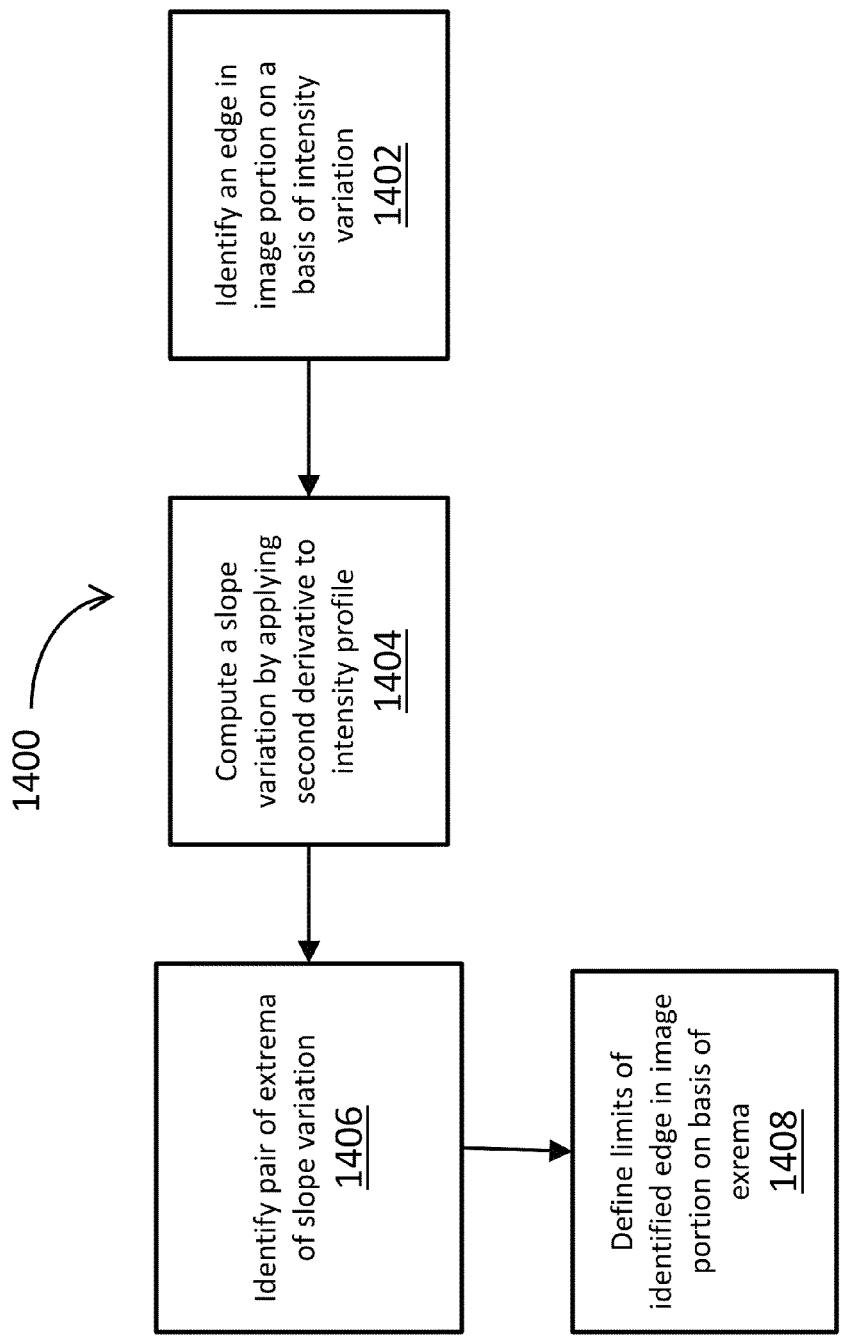
FIG. 14 is a flow diagram illustrating a method of identifying an edge region associated with an identified edge in an image portion, according to a broad embodiment of the present invention.

The flowchart of FIG. 14 illustrates this method for determining the limits of an edge identified in an image portion, according to a non-limiting example of implementation of the present invention. At step 1402, an edge is identified within an image portion on the basis of a corresponding intensity variation. A slope variation is computed at step 1404, by applying a second derivative to at least a portion of the intensity profile representation of the image portion. At step 1406, a pair of extrema (i.e. a peak and a valley) are identified on the slope variation, indicating the points of maximum curvature of the intensity profile of the image portion. In general, these extrema, or more specifically their positions along the x-axis, define a good approximation of the limits of the identified edge in the image portion (i.e. locate an edge region corresponding to the identified edge), at step 1408.

Figure 13B:
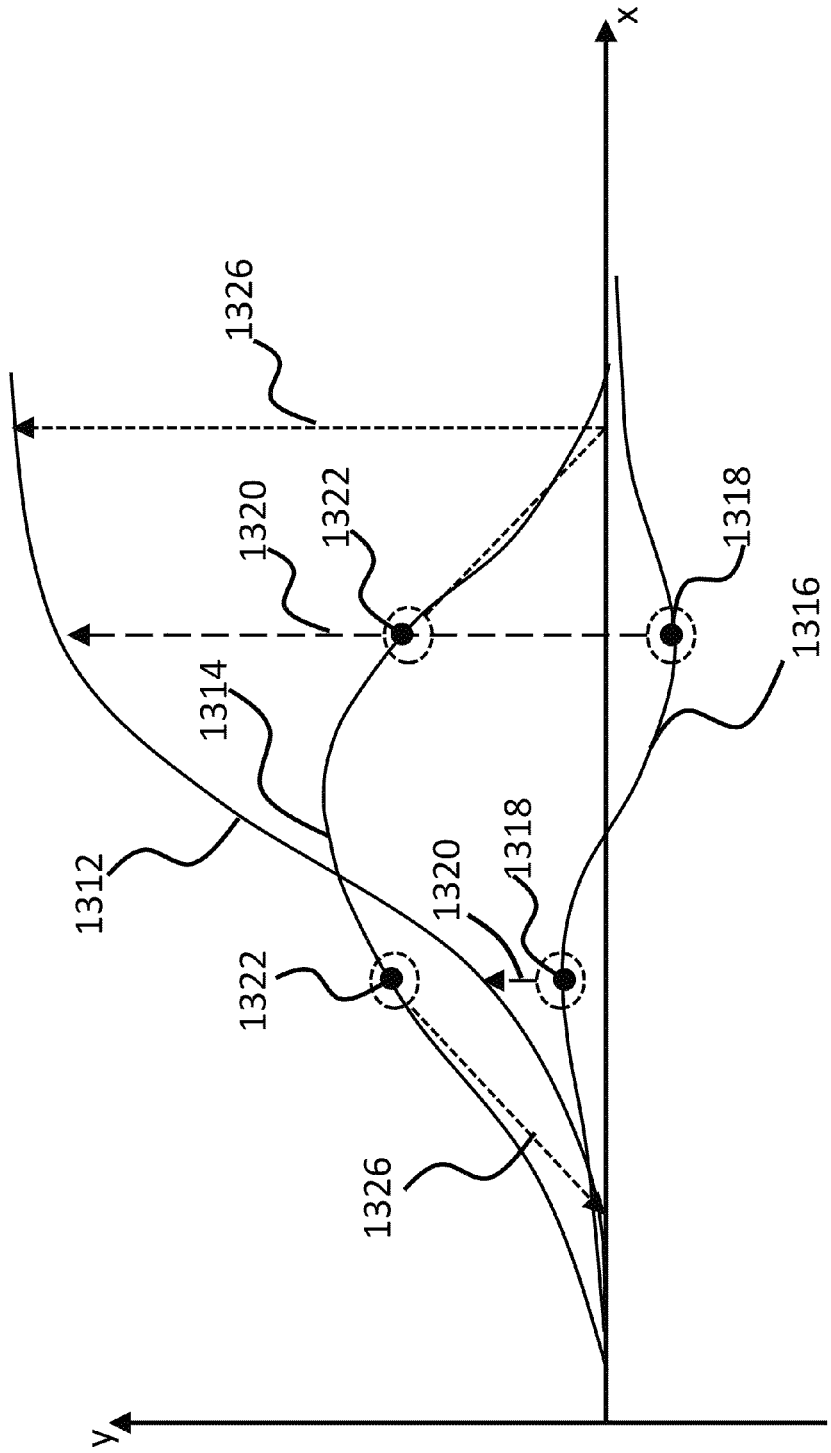
FIG. 13B is a graph illustrating the usage of a second derivative of the intensity profile of an image portion to determine the limits of an edge identified in the image portion, according to another example of implementation of the present invention.

In another example shown in FIG. 13B, for the intensity profile 1312 and the associated intensity variation 1314 (first derivative) and slope variation 1316 (second derivative), the x-axis positions of the maximum points of curvature 1318 on the second derivative 1316 do not accurately correspond to the beginning and end of the edge in the intensity profile representation 1312. Rather, the maximums of curvature 1318 have x-axis positions that are too far inside the edge, as shown by the arrows 1320. Thus, in a variant method for identifying the limits of an edge identified in an image portion, the extrema of the second derivative 1316 are used to determine corresponding points of inflexion 1322 of the first derivative 1314. One iteration (or step) of Newton's method is then applied to the first derivative 1314 from the points of inflexion 1322, in order to better define the positions of the limits 1324 of the edge, as shown by arrows 1326.

Newton's method is a method for finding successively better approximations to the roots (or zeroes) of a real-valued function. In the example of FIG. 13B, the idea behind the application of a step of Newton's method is to compute the x-axis intercept of the line of slope m passing through point (x1, y1), where m is the value of the second derivative at the maximum of curvature, x1 is the position of the maximum of curvature and y1 is the value of the first derivative at the maximum of curvature. Noting the x-axis intercept point (x2, y2), where y2=0 by definition, the x-intercept is computed from the slope equation m=(y2−y1)/(x2−x1) by isolating x2=x1−y1/m. Thus, in FIG. 13B, the positions 1324, which result from the application of an iteration of Newton's method to the points of inflexion 1322, are considered to be the start and end of the edge region.

Note that a contrast of the identified edge may be measured on the intensity profile representation 1312 at the edge limit positions resulting from the application of an iteration of Newton's method. Optionally, an edge region defined for an identified edge may be narrowed (i.e. refined) as long as this narrowing does not decrease the edge contrast. More specifically, an identified beginning position (left end) of an edge may be moved rightward along the x-axis until the intensity starts to increase, while the identified end position (right end) of the edge may be moved leftward along the x-axis until the intensity starts to decrease.

Figure 15:
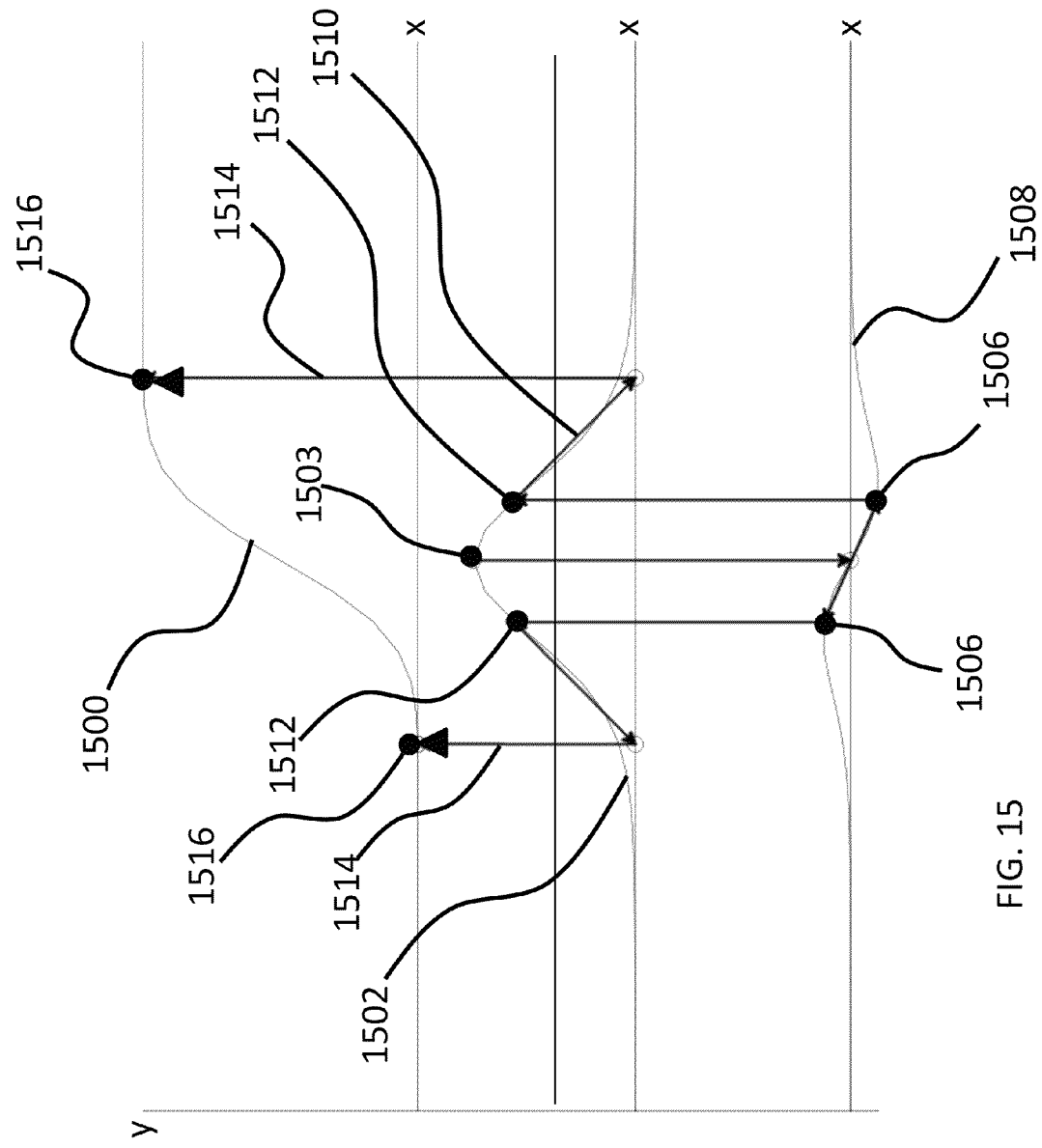
FIG. 15 is a graph illustrating the usage of a second derivative of the intensity profile of an image portion, as well as an iteration of Newton's method, to identify an edge region associated with an identified edge in the image portion, according to yet another example of implementation of the present invention.

With reference to the exemplary graph of FIG. 15, an image portion has a corresponding intensity profile 1500, a corresponding slope 1502 (i.e. first derivative of the intensity profile curve 1500) and a slope variation 1508 (i.e. second derivative of the intensity profile 1500). Extremum 1503 of the intensity variation 1502 is identified as corresponding to an actual edge in the image portion, for which a start and an end position are to be identified. In a non-limiting example of implementation, the beginning and end (i.e. limits) of the edge region within the image portion are located on the basis of the slope variation 1508 (i.e. second derivative of the intensity profile 1500), or more specifically on a basis of the extrema 1506 of the second derivative 1508, which correspond to the maximum points of curvature of the intensity profile. These extrema 1506 determine the points of inflexion 1512 on the first derivative 1502, from which points of inflexion 1512 an iteration of Newton's method can be applied to the intensity variation 1502 in order to reveal the limits 1516 of the identified edge in the image portion, as indicated by arrows 1514.

Figure 16:
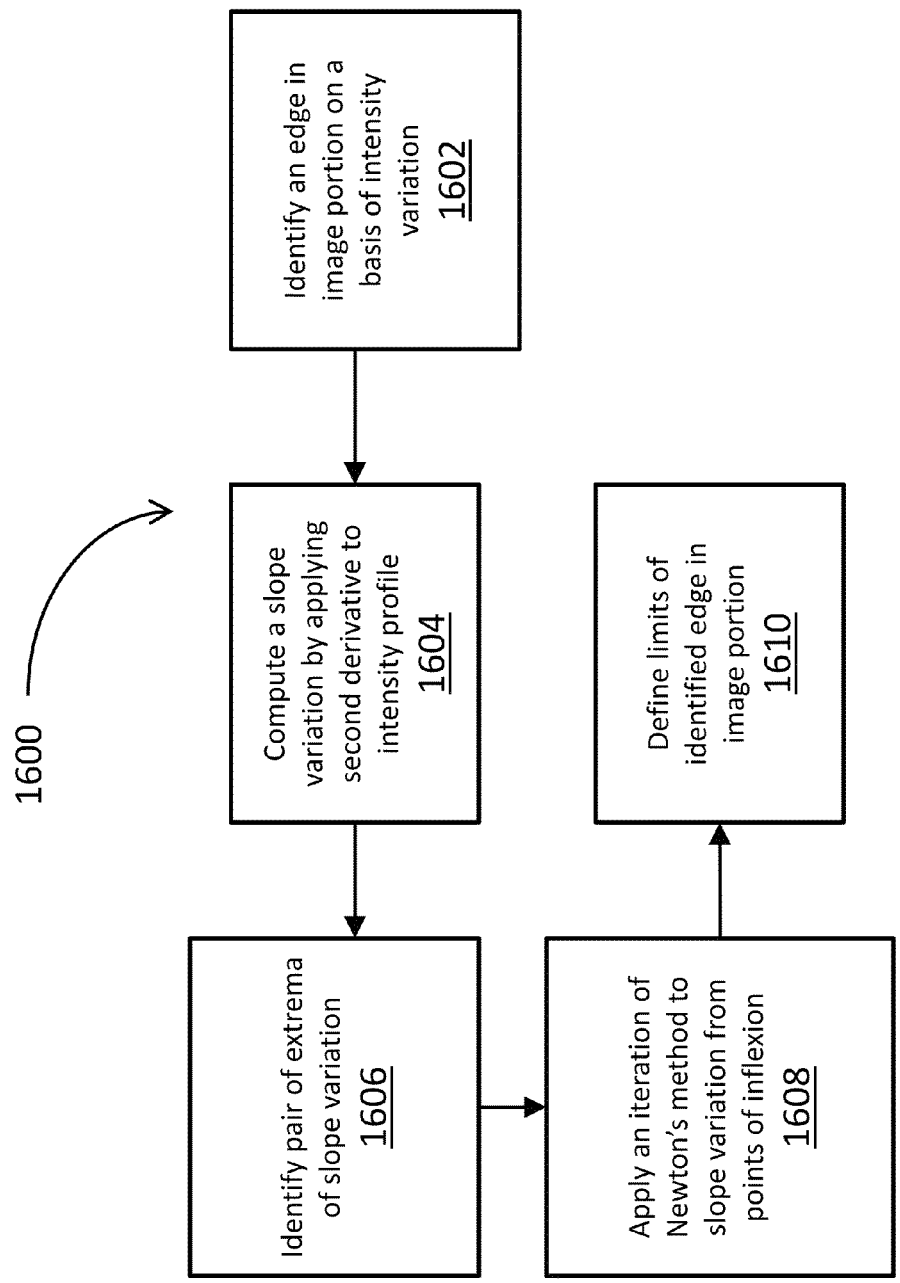
FIG. 16 is a flow diagram illustrating a method of identifying an edge region associated with an identified edge in an image portion, according to a variant embodiment of the present invention.

FIG. 16 is a flowchart illustrating a method for determining the limits of an identified edge in an image portion, using an iteration of Newton's method. At step 1602, an edge is identified in an image portion on a basis of a corresponding intensity profile representation and its associated first derivative. A slope variation for the image portion is next computed at step 1604, by applying a second derivative to at least a portion of the intensity profile of the image portion. At step 1606, extrema (i.e. a peak and a valley) of the slope variation are identified, corresponding to a pair of points of inflexion of the first derivative. At step 1608, an iteration of Newton's method is applied to the slope variation from the identified points of inflexion, thereby identifying positions along the x-axis that correspond to the limits (i.e. the beginning and the end) of the identified edge at step 1610.

Figure 17:
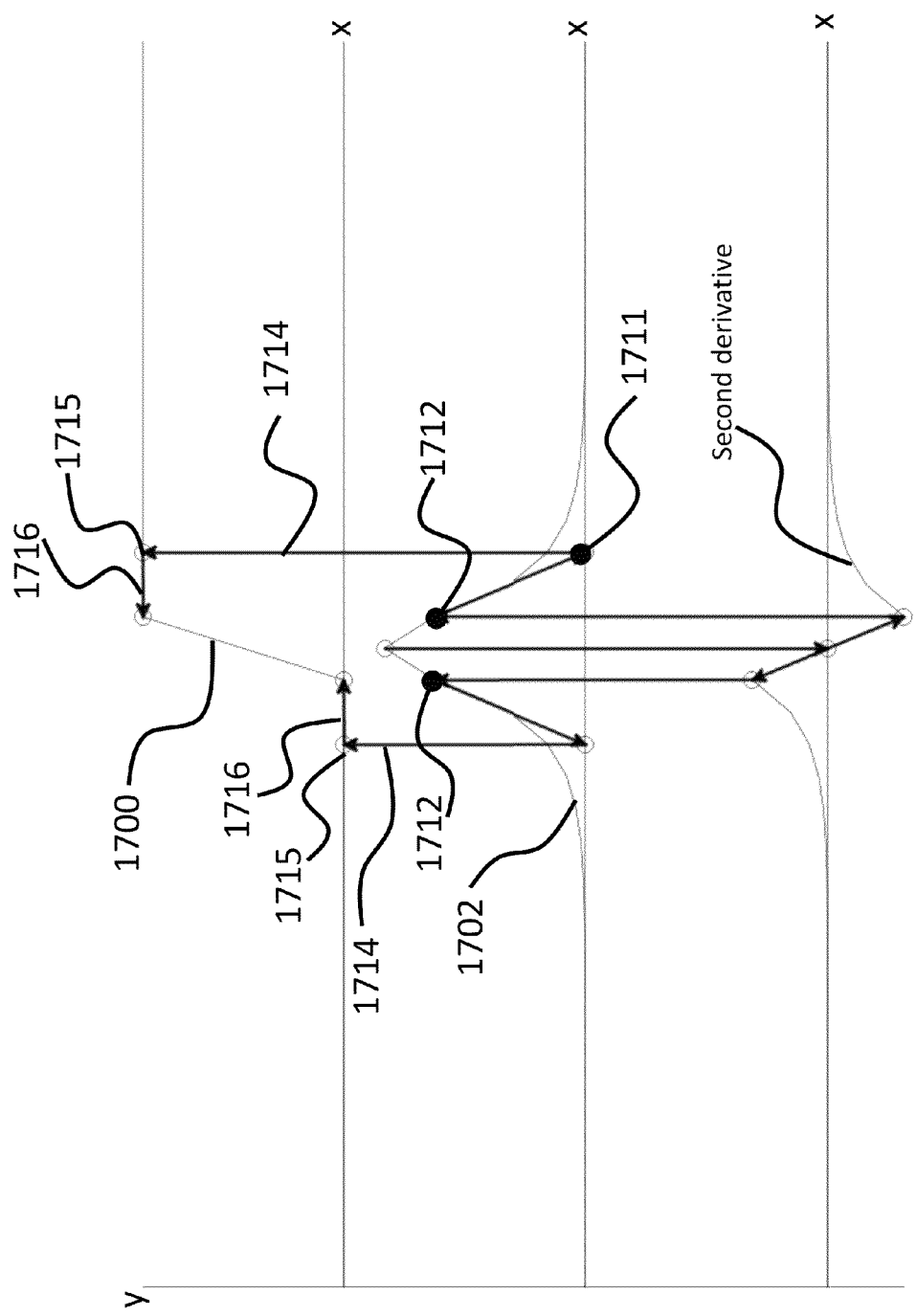
FIG. 17 is a graph illustrating the usage of a second derivative of the intensity profile of an image portion, as well as an iteration of Newton's method and narrowing of the edge limits, to identify an edge region associated with an identified edge in the image portion, according to another example of implementation of the present invention.

In FIG. 15, the portion of the intensity profile 1500 that represents the edge transition is relatively smooth; however, in a case where the intensity profile curve portion that represents the edge transition is relatively sharp, it may be desirable when locating the limits of the edge to further narrow these limits up to a point where contrast on the intensity profile drastically changes for greater precision, as discussed above. Accordingly, the exemplary graph of FIG. 17 illustrates the identification of the limits of an identified edge from an intensity profile 1700 having a relatively sharp transition in the region of the edge. Once the limits 1715 of the identified edge within the image portion are located using an iteration of Newton's method from the points of inflexion 1712 of the first derivative 1702, as shown by arrows 1714, a corrective step is applied by narrowing the edge region limits up to a point where contrast on the intensity profile 1700 drastically changes, as shown by arrows 1716. In the example of FIG. 17, the limits (i.e. beginning and end) of the identified edge are moved towards each other until an increase or a decrease of the intensity is detected.

Note that, when refining or narrowing the limits of an edge, an increase or a decrease of the intensity may be detected only when this increase or decrease is greater than a predetermined threshold value.

Figure 18:
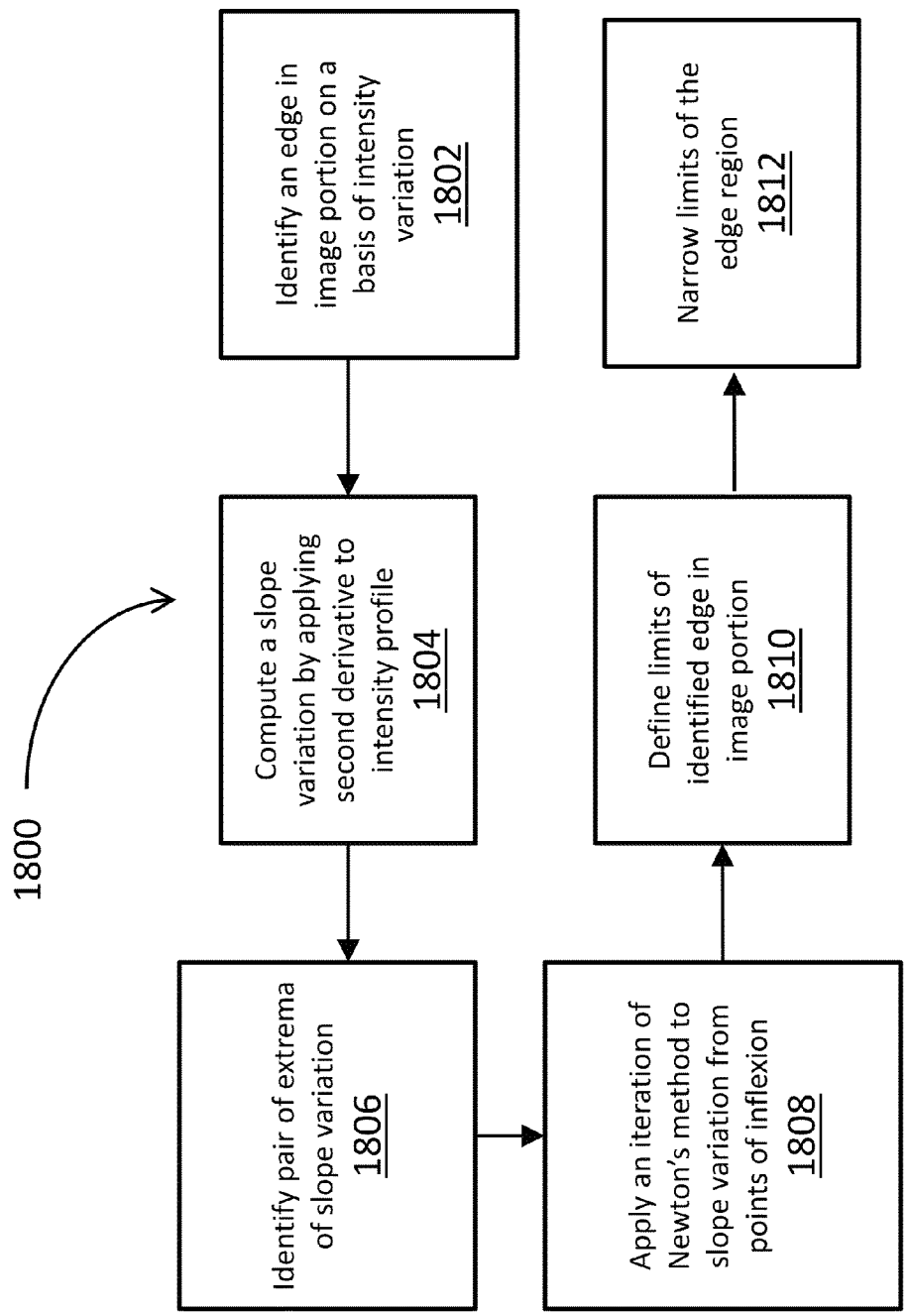
FIG. 18 a flow diagram illustrating a method of identifying an edge region associated with an identified edge in an image portion, according to yet another variant embodiment of the present invention.
Figure 19:
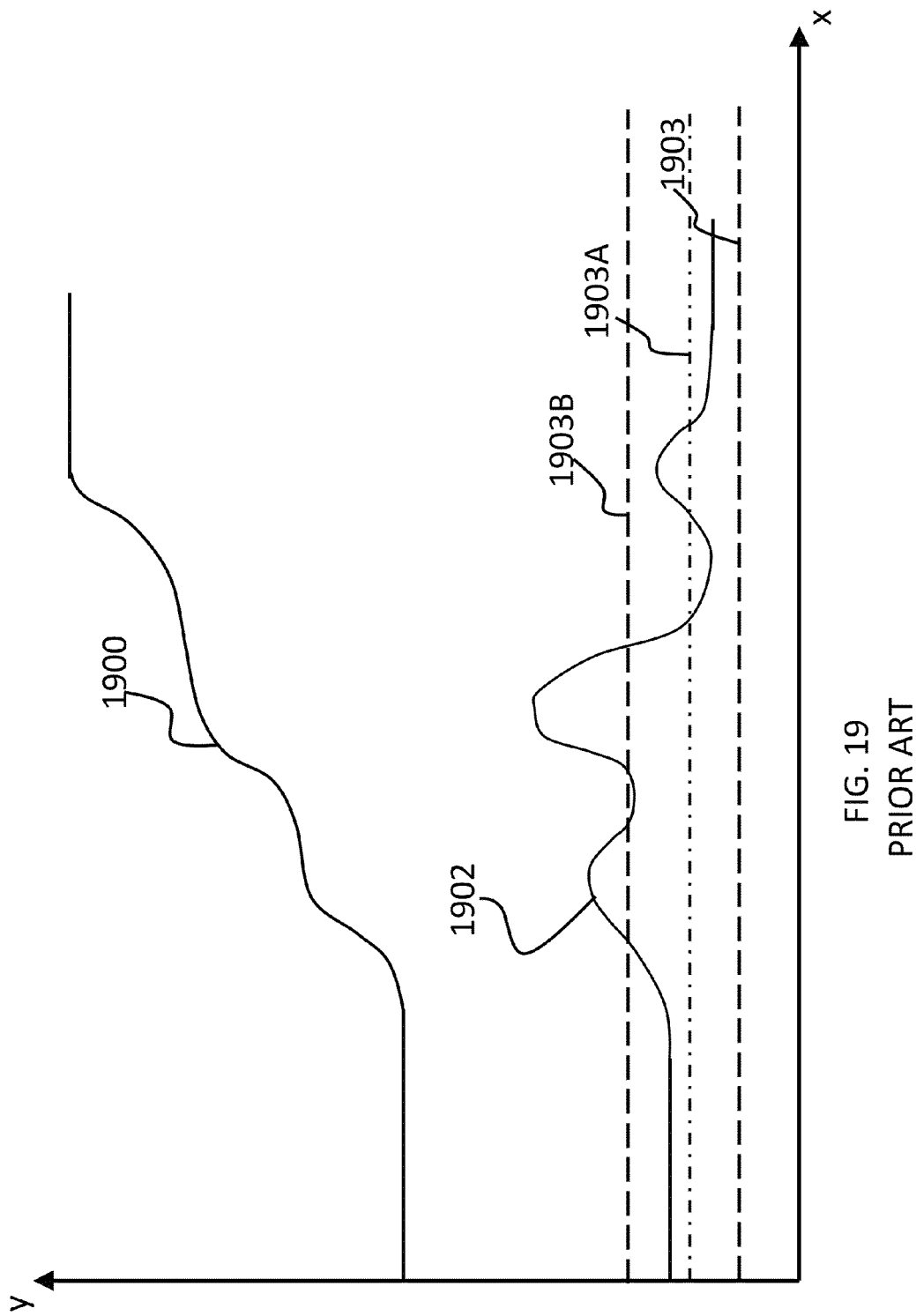
FIG. 19 illustrates an example of an intensity profile and intensity variation associated with an image portion, and the usage of a global threshold to determine if edge candidates identified at positions on the intensity variation correspond to actual edges in the image portion, according to the prior art.

This variant method for determining the limits of an identified edge in an image portion, using an iteration of Newton's method and applying a narrowing of the identified edge limits, is illustrated in the flowchart of FIG. 18. At step 1802, an edge is identified in an image portion on a basis of a corresponding intensity profile and its associated first derivative. A slope variation for the image portion is next computed at step 1804, by applying a second derivative to at least a portion of the intensity profile of the image portion. At step 1806, extrema (i.e. a peak and a valley) of the slope variation curve are identified, corresponding to a pair of points of inflexion of the first derivative. At step 1808, an iteration of Newton's method is applied to the slope variation from the identified points of inflexion, thereby identifying positions along the x-axis that correspond to the limits (i.e. the beginning and the end) of the identified edge at step 1810. At step 1812, the edge region is narrowed by moving the identified limits toward each other until an increase or a decrease of the intensity is detected.

Figure 11:
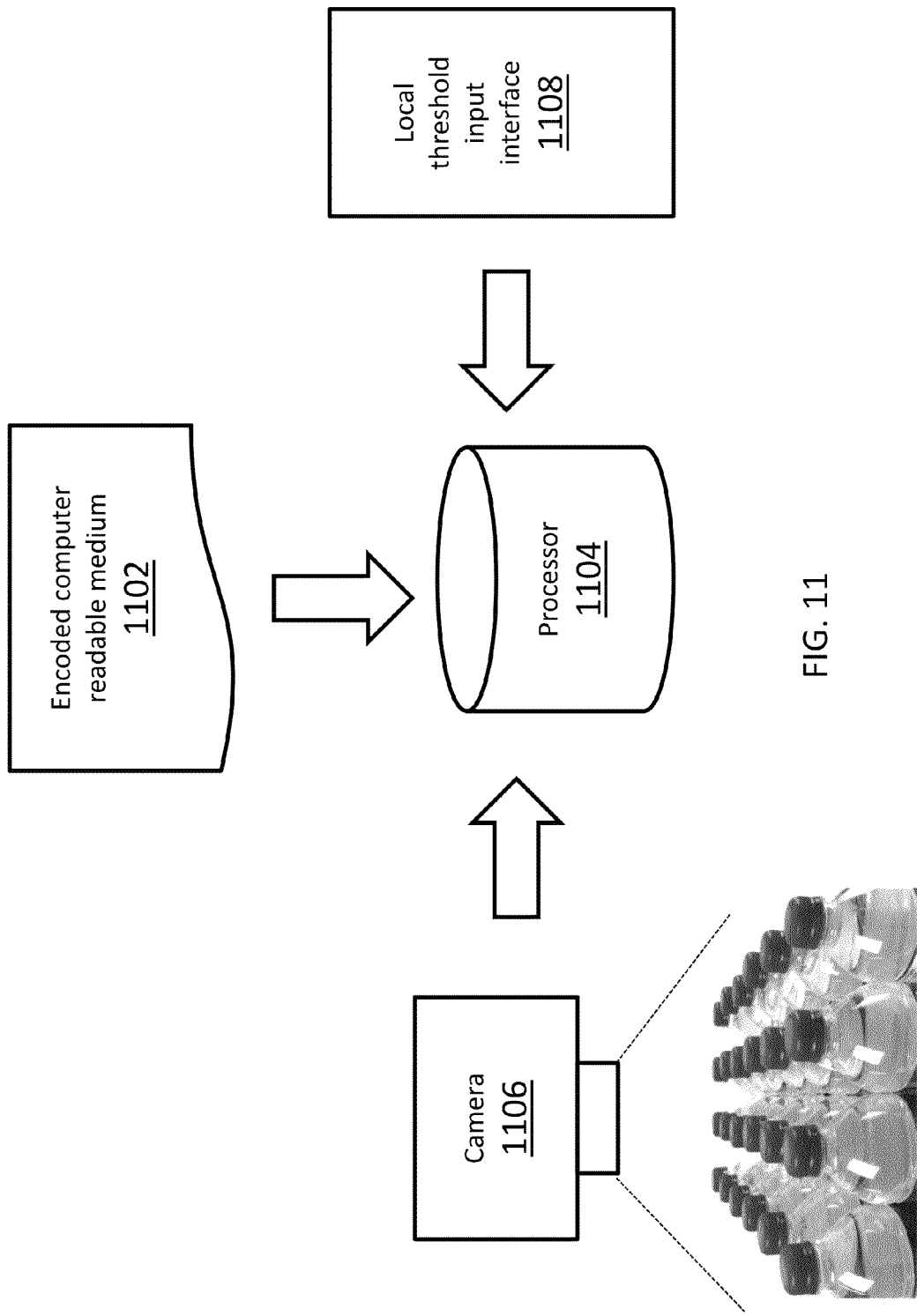
FIG. 11 is a block diagram of an edge detection system, according to a broad embodiment of the present invention.

FIG. 11 illustrates a system for identifying an edge in an image, according to a broad embodiment of the present invention. A computer readable medium 1102, which may be non-transitory tangible media or a transitory propagating signal, is encoded with instructions that, when executed by a processor 1104, implement at least one of the aforementioned methods for identifying an edge in an image portion. In one example, the computer readable medium 1102 is encoded with instructions which, when executed by a processing unit 1104, implement a method for determining if an edge candidate at a selected position along the x-axis corresponds to an actual edge in the image portion.

In one variant, the processor 1104 is adapted to process an image captured by a camera 1106, to select a portion of the image and to determine the intensity profile and associated intensity variation for the image portion. In another variant, the processor 1104 is adapted to receive or retrieve the intensity profile and its associated intensity variation for an image portion, which have been computed by another processor. In yet another variant, the processor 1104 is adapted to receive or retrieve the intensity variation associated with an intensity profile of an image portion, which has been computed by another processor. The processor 1104 then implements the method of FIG. 5A or 5B, on a basis of the determined intensity variation and a predefined slope tolerance, the latter used to compute the local threshold for each edge candidate.

The slope tolerance may be predetermined or may be set by another module of the system or by a user via the local threshold input interface 1108. The slope tolerance may also be set on-the-fly by the processor or by another module connected to the processor, at least on a basis of the intensity variation.

In a specific, non-limiting example of implementation, the computer readable medium 1102 is encoded with the following algorithm performing edge detection on a basis of both a global threshold and a local threshold:

Parameters
GlobalThreshold is a parameter used to determine the minimal slope value required to detect an edge candidate;
SlopeTolerance is a parameter to determine the LocalThreshold associated with an edge candidate;
PolarityToIgnore is a parameter element of $\{-1, 0, 1\}$ used to select an edge polarity that should be ignored—default value is 0 (i.e. ignore no polarity).
Variables
EdgeEnd is the last position greater or equal to the EffectiveThreshold associated to an edge candidate;
EdgePolarity is the polarity of the current edge candidate (i.e. −1 or 1) or 0 if there is no current edge candidate;
EdgePosition is the position of the extremum indicating the location of the current edge candidate or the center of the flat peak/valley composing the (pseudo-) extremum;
EdgeStrength is the edge strength of the current edge candidate or a value just under the GlobalThreshold if there are no edge candidate;
EdgeStart is the first position greater or equal to the EffectiveThreshold associated with an edge candidate;
EffectiveThreshold is the threshold effectively associated with the current edge candidate. It is used to ensure the threshold used by the edge candidate is never lower than GlobalThreshold;
I' is the slope function derived from the intensity profile;
Imin is the minimal slope value encountered (reset each time an edge is validated);
PreviousPolarity is the polarity of the slope at the previous position;
Polarity is the polarity of the slope at the current position;
x1 is the current position;
x2 is the position associated with Imin;
xmax is the number of elements of I'.
RESET_EDGE SUBROUTINE
1. EdgeStrength←GlobalThreshold−ϵ, where ϵ is a very small value;
2. EdgePolarity←0;
3. Return;
INITIALISATION
1. Call RESET_EDGE
2. Imin←0;
3. Polarity←0;
4. x1←1;
5. xmax←number of elements of I';
ALGORITHM
1. PreviousPolarity←Polarity;
2. Polarity←sign(I'(x1));
3. If EdgePolarity=0, i.e. there is no candidate detected yet:
   a. If Polarity≠PreviousPolarity, i.e. there is a zero-crossing:
      i. x2←x1;
      ii. Imin←0;
   b. Else if Polarity*I'(x1)<Imin: i.e. there is no zero crossing but the value of Imin and x2 should be updated since there is a x1 at which the intensity variation is lower (or higher) than the currently saved extremum (min or max) of the intensity variation.
      i. x2←x1;
      ii. Imin Polarity*I'(x1);
4. Else if EdgePolarity*I'(x1)<EffectiveThreshold, i.e. candidate is valid: is current x1 the end of a boundary region of selected candidate.
   a. EdgeEnd←x1−1;
   b. If I'(EdgePosition)=I'(EdgePosition+1), i.e. flat peak/valley:
      i. Compute range of flat peak/valley;
      ii. EdgePosition←center of flat peak/valley;
   c. Save EdgeStrength, EdgePolarity, EdgeEnd, EdgeStart and EdgePosition as a new Edge, i.e. save relevant edge characteristics;
   d. x2←x1;
   e. Imin←EdgePolarity*I'(x1);
   f. EffectiveThreshold←GlobalThreshold;
   g. Call RESET_EDGE;
5. DETECT CANDIDATE If (Polarity≠0) and (Polarity≠PolarityToIgnore) and (Polarity*I'(x1)>EdgeStrength) and (Polarity*I'(x1)>Polarity*I'(x1−1)) and (Polarity*I'(x1)≥Polarity*I'(x1+1)), i.e. is the current x1 a candidate?
   a. LocalThreshold←Polarity*I'(x1)−Slope Tolerance;
   b. EffectiveThreshold←max{LocalThreshold, GlobalThreshold};
   c. If Imin<EffectiveThreshold:
      i. Increment x2 until Polarity*I'(x2)≥EffectiveThreshold;
      ii. EdgeStart←x2;
      iii. EdgePosition←x1;
      iv. EdgeStrength←Polarity*I'(x1);
      v. EdgePolarity←Polarity;
6. Increment x1;
7. If x1≤xmax then loop to step 1;
8. End.

In general, the algorithm presented above allows a sequential and efficient analysis of a portion of an image for identifying edges in the region. The algorithm will sequentially detect all the edges present in the portion of the image according to a desired slope tolerance and a desired edge polarity. For example, a user implementing the method in a specific application may determine the slope tolerance and the edge polarity that edge candidates should satisfy in order to be detected.

In this algorithm, the method starts with initialization steps. For a current position x1, the method determines its intensity variation I'(x1) and the sign of its intensity variation sign(I'(x1)). In a first step (referring to point 3 of ALGORITHM above) the values of (x2, Imin) are updated to correspond to the position of the extremum of the intensity variation in the already analyzed and not discarded portion of the image (note that when the intensity variation is positive, Imin corresponds to the first minimum and when the intensity variation is negative, Imin is a maximum). In a second step (referring to step 4 of ALGORITHM), the method determines if a candidate has already been detected (EdgePolarity≠0) and if the currently analyzed position x1 is indicative of the end of the edge candidate. If there exists an edge candidate and the position x1 is indicative of the end of the edge candidate, than the method can now validate the edge by updating all its characteristics and outputting them. All positions before x1 are discarded and will not be reprocessed. The position x1 is then incremented and the process continues its execution with point 5.

If the position x1 is not indicative of the end of an edge candidate or if there is no edge candidate detected yet, then the method would jump to the next step, point 5 of ALGORITHM. At this step, the position x1 is analyzed to determine if there exists an edge candidate at this location or a better edge candidate if there is already a candidate under evaluation. An edge candidate is detected only if the position x1 satisfies a plurality of conditions as expressed at point 5. In this non-limiting example, the method detects an edge candidate if the polarity at position x1 is different from zero and should not be ignored, if the intensity variation at x1 is a local extremum and if the absolute value of the intensity variation at x1 is higher than the strength of an edge candidate previously detected and not validated yet (or greater or equal than the global threshold if there is no edge candidate currently under evaluation). If x1 satisfies all these conditions, an effective threshold is computed according to the intensity variation at x1 and the desired slope tolerance. The effective threshold is the minimum value between the local threshold and the global threshold, where the local threshold is based on the slope tolerance. Finally, characteristics of the newly detected edge candidate are updated, such as its position, its strength, its start and its polarity, only if Imin is smaller than the effective threshold. If this last condition is not satisfied, the method exits point 5 without updating the characteristics of the edge candidate and consequently without detecting an edge candidate. Next, x1 is further incremented and the method returns to the beginning of the algorithm. The method continues analyzing the positions x in the portion of the image until the end of the portion is reached.

Figure 12A:
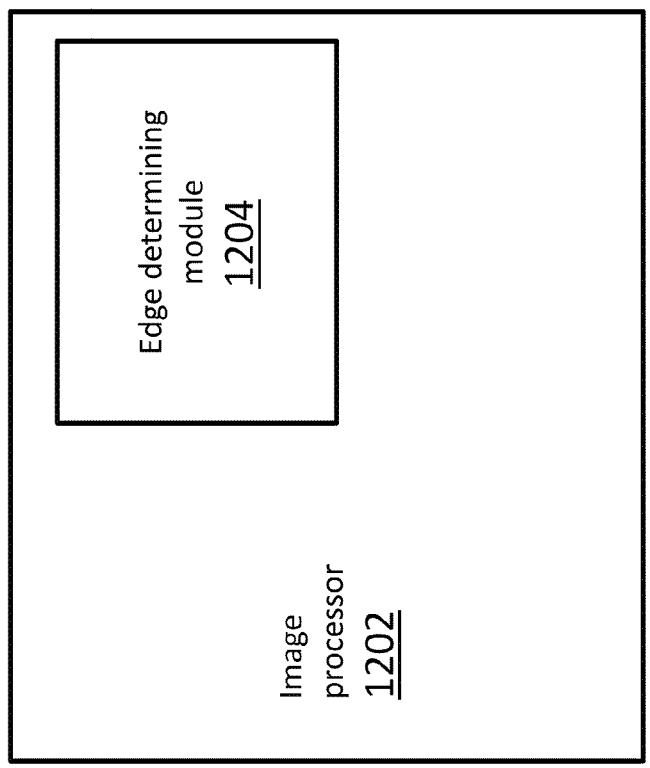
FIG. 12A illustrates an image processor with an edge determining module, according to another broad embodiment of the present invention.

FIG. 12A illustrates an image processor operative to identify edges in an image, according to a further embodiment of the present invention. A processor 1202, such as an image processor, comprises an edge determining module 1204. The edge determining module 1204 is operative to calculate a local threshold for an edge candidate according to the method of FIG. 5B.

Figure 12B:
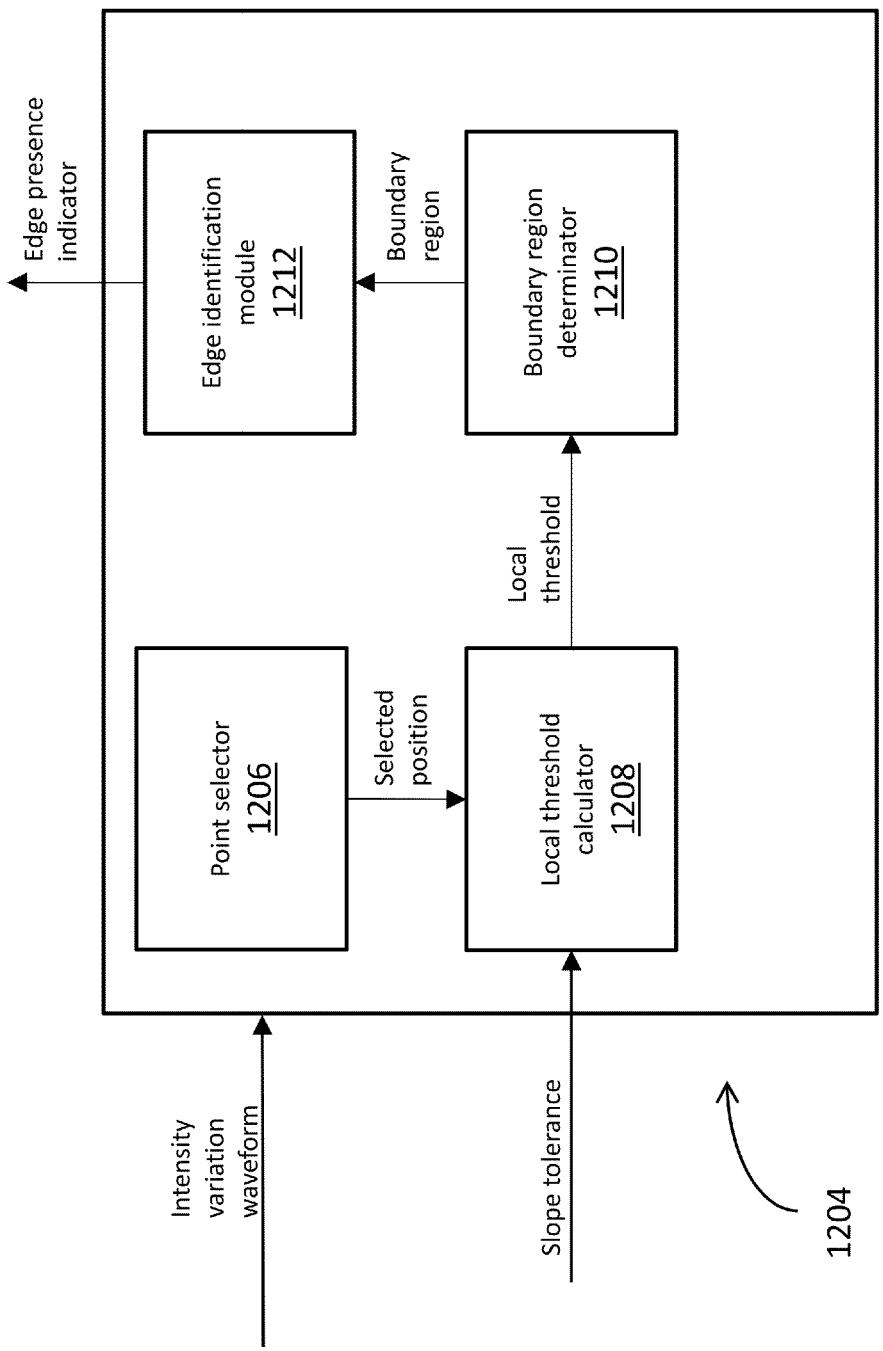
FIG. 12B is a block diagram of the edge determining module of FIG. 12A, according to yet another broad embodiment of the present invention.

FIG. 12B is a block diagram of the edge determining module 1204, according to a non-limiting example of implementation of the present invention. The edge determining module 1204 is adapted to receive an intensity variation input and to output an edge presence indicator. The edge determining module 1204 comprises a point selector 1206 that is adapted to sequentially select a position along the x-axis of the intensity variation or to select a position corresponding to a peak or valley of the intensity variation. A local threshold calculator 1208 is adapted to receive as input a slope tolerance and the selected position, based on which the local threshold calculator 1208 calculates an associated local threshold according to the method step 512 of FIG. 5B. A boundary region determinator 1210 is adapted to receive as input the calculated local threshold for the selected position along the x-axis, and to determine a boundary region according to the method step 514 of FIG. 5B. An edge identification module 1212 is adapted to receive as input the determined boundary region and to identify an edge presence according to the method step 514. The edge identification module 1212 outputs an edge presence indicator according to the method step 516 of FIG. 5B.

In another variant, the boundary region determinator 1210 is adapted to receive as input the calculated local threshold for the edge candidate at the selected x-axis position and to determine the limits of an identified edge according to one of the respective methods 1400, 1600, 1800 of FIGS. 14, 16 and 18.

The various components and modules of the systems discussed hereinabove may all be implemented in software, hardware, firmware or any combination thereof, within one piece of equipment or split up among various different pieces of equipment. Obviously, various different software, hardware and/or firmware based implementations of the techniques of the present invention are possible and included within the scope of the present invention.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A method for identifying with a computing unit an edge in a portion of an image, the portion of the image having an associated intensity variation, said method comprising:
   a. identifying a position of an edge candidate and establishing a slope value from the intensity variation at said position;
   b. if the slope value at said position is positive, calculating a local threshold associated with the edge candidate by subtracting a slope tolerance from the slope value at said position;
   c. determining if the edge candidate corresponds to an actual edge by analysing the intensity variation within a boundary region extending on either side of the edge candidate's position, said boundary region defined by the local threshold, wherein for a positive slope value at said position said determining includes identifying the edge candidate as an actual edge if each other position within the boundary region has a respective slope value that is smaller or equal to the slope value at said position;
   d. if the edge candidate corresponds to an actual edge of the image portion, identifying the edge as located in the portion of the image.

2. A method as defined in claim 1, wherein if the slope value at said position is negative, said method comprises:
   a. calculating the local threshold by adding the slope tolerance to the slope value at said position;
   b. identifying the edge candidate as an actual edge if each other position within the boundary region has a respective slope value that is greater or equal to the slope value at said position.

3. The method as defined in claim 1, further comprising identifying the edge candidate as an actual edge only if at least one position on either side of the edge candidate's position is outside of the boundary region and has a slope value that is smaller than the local threshold.

4. The method as defined in claim 2, further comprising identifying the edge candidate as an edge only if at least one position on either side of the edge candidate's position is outside of the boundary region and has a slope value that is greater than the local threshold.

5. The method as defined in claim 1, wherein if the edge candidate corresponds to an actual edge of the image portion, said method further comprises:
   a. computing a second derivative of an intensity profile of the image portion;
   b. identifying extrema of the second derivative and corresponding points of inflexion of the intensity variation;
   c. applying an iteration of Newton's method to the intensity variation from the points of inflexion, thereby identifying a start position and an end position of the actual edge within the portion of the image.

6. The method as defined in claim 1, wherein the slope tolerance used to compute the local threshold for each one of a plurality of different edge candidates is constant within the portion of the image.

7. The method as defined in claim 1, wherein said position is one at which the intensity variation is characterized by a local extremum.

8. The method as defined in claim 1, wherein said identifying a position of an edge candidate comprises comparing slope values at different positions of the intensity variation to a global threshold.

9. The method as defined in claim 1, wherein identifying the edge includes determining at least one characteristic of the edge.

10. The method as defined in claim 1, wherein the intensity variation is computed from an intensity profile associated with the portion of the image.

11. A non-transitory computer readable medium encoded with instructions that when executed by at least one processor implement a method for identifying an edge in a portion of an image, the portion of the image having an associated intensity variation, said method comprising:
   a. identifying a position of an edge candidate and establishing a slope value from the intensity variation at said position;
   b. if the slope value at said position is positive, calculating a local threshold for the edge candidate by subtracting a slope tolerance from the slope value at said position;
   c. determining if the edge candidate corresponds to an actual edge of the image portion by analysing the intensity variation within a boundary region extending on either side of the edge candidate's position, said boundary region defined by the local threshold, wherein for a positive slope value at said position said determining includes identifying the edge candidate as an actual edge if each other position within the boundary region has a respective slope value that is smaller or equal to the slope value at said position;
   d. if the edge candidate corresponds to an actual edge of the image portion, identifying the edge as located in the portion of the image.

12. A method for identifying with a computing unit an edge in a portion of an image, the portion of the image having an associated intensity variation, said method comprising:
   a. identifying a position of an edge candidate and establishing a slope value from the intensity variation at said position;
   b. if the slope value at said position is negative, calculating a local threshold associated with the edge candidate by adding a slope tolerance to the slope value at said position;
   c. determining if the edge candidate corresponds to an actual edge by analysing the intensity variation within a boundary region extending on either side of the edge candidate's position, said boundary region defined by the local threshold, wherein for a negative slope value at said position said determining includes identifying the edge candidate as an actual edge if each other position within the boundary region has a respective slope value that is greater or equal to the slope value at said position;
   d. if the edge candidate corresponds to an actual edge of the image portion, identifying the edge as located in the portion of the image.

13. A method as defined in claim 12, wherein if the slope value at said position is positive, said method comprises:
   a. calculating the local threshold by subtracting the slope tolerance from the slope value at said position;
   b. identifying the edge candidate as an actual edge if each other position within the boundary region has a respective slope value that is smaller or equal to the slope value at said position.

14. The method as defined in claim 13, further comprising identifying the edge candidate as an actual edge only if at least one position on either side of the edge candidate's position is outside of the boundary region and has a slope value that is smaller than the local threshold.

15. The method as defined in claim 12, further comprising identifying the edge candidate as an edge only if at least one position on either side of the edge candidate's position is outside of the boundary region and has a slope value that is greater than the local threshold.

16. The method as defined in claim 12, wherein if the edge candidate corresponds to an actual edge of the image portion, said method further comprises:
   a. computing a second derivative of an intensity profile of the image portion;
   b. identifying extrema of the second derivative and corresponding points of inflexion of the intensity variation;
   c. applying an iteration of Newton's method to the intensity variation from the points of inflexion, thereby identifying a start position and an end position of the actual edge within the portion of the image.

17. The method as defined in claim 12, wherein the slope tolerance used to compute the local threshold for each one of a plurality of different edge candidates is constant within the portion of the image.

18. The method as defined in claim 12, wherein said position is one at which the intensity variation is characterized by a local extremum.

19. The method as defined in claim 12, wherein said identifying a position of an edge candidate comprises comparing slope values at different positions of the intensity variation to a global threshold.

20. The method as defined in claim 12, wherein identifying the edge includes determining at least one characteristic of the edge.

21. The method as defined in claim 12, wherein the intensity variation is computed from an intensity profile associated with the portion of the image.

22. A method for identifying with a computing unit an edge in a portion of an image, the portion of the image having an associated intensity variation, said method comprising:
   a. identifying a position of an edge candidate and determining a slope value from the intensity variation at said position;
   b. calculating a local threshold associated with the edge candidate on a basis of a slope tolerance and from the slope value at said position;
   c. determining if the edge candidate corresponds to an actual edge by analysing the intensity variation within a boundary region extending on either side of the edge candidate's position, said boundary region defined by the local threshold;
   d. if the edge candidate corresponds to an actual edge of the image portion:
      i. identifying the edge as located in the portion of the image;
      ii. computing a second derivative of an intensity profile of the image portion;
      iii. identifying extrema of the second derivative and corresponding points of inflexion of the intensity variation;
      iv. applying an iteration of Newton's method to the intensity variation from the points of inflexion, thereby identifying a start position and an end position of the actual edge within the portion of the image.

23. The method as defined in claim 22, wherein the slope tolerance used to compute the local threshold for each one of a plurality of different edge candidates is constant within the portion of the image.

24. The method as defined in claim 22, wherein said position is one at which the intensity variation is characterized by a local extremum.

25. The method as defined in claim 22, wherein said identifying a position of an edge candidate comprises comparing slope values at different positions of the intensity variation to a global threshold.

26. The method as defined in claim 22, wherein identifying the edge includes determining at least one characteristic of the edge.

27. The method as defined in claim 22, wherein the intensity variation is computed from the intensity profile associated with the portion of the image.

28. A non-transitory computer readable medium encoded with instructions that when executed by at least one processor implement a method for identifying an edge in a portion of an image, the portion of the image having an associated intensity variation, said method comprising:
  a. identifying a position of an edge candidate and establishing a slope value from the intensity variation at said position;
  b. if the slope value at said position is negative, calculating a local threshold for the edge candidate by adding a slope tolerance to the slope value at said position;
  c. determining if the edge candidate corresponds to an actual edge of the image portion by analysing the intensity variation within a boundary region extending on either side of the edge candidate's position, said boundary region defined by the local threshold, wherein for a negative slope value at said position said determining includes identifying the edge candidate as an actual edge if each other position within the boundary region has a respective slope value that is greater or equal to the slope value at said position;
  d. if the edge candidate corresponds to an actual edge of the image portion, identifying the edge as located in the portion of the image.

29. A non-transitory computer readable medium encoded with instructions that when executed by at least one processor implement a method for identifying an edge in a portion of an image, the portion of the image having an associated intensity variation, said method comprising:
  a. identifying a position of an edge candidate and determining a slope value from the intensity variation at said position;
  b. calculating a local threshold associated with the edge candidate on a basis of a slope tolerance and from the slope value at said position;
  c. determining if the edge candidate corresponds to an actual edge of the image portion by analysing the intensity variation within a boundary region extending on either side of the edge candidate's position, said boundary region defined by the local threshold;
  d. if the edge candidate corresponds to an actual edge of the image portion:
    i. identifying the edge as located in the portion of the image;
    ii. computing a second derivative of an intensity profile of the image portion;
    iii. identifying extrema of the second derivative and corresponding points of inflexion of the intensity variation;
    iv. applying an iteration of Newton's method to the intensity variation from the points of inflexion, thereby identifying a start position and an end position of the actual edge within the portion of the image.

* * * * *